(12) United States Patent
Koyuncu et al.

(10) Patent No.: US 12,537,980 B2
(45) Date of Patent: Jan. 27, 2026

(54) ATTENTION BASED CONTEXT MODELLING FOR IMAGE AND VIDEO COMPRESSION

(71) Applicant: HUAWEI TECHNOLOGIES CO., LTD., Shenzhen (CN)

(72) Inventors: Ahmet Burakhan Koyuncu, Munich (DE); Han Gao, Shenzhen (CN); Atanas Boev, Munich (DE); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 14 days.

(21) Appl. No.: 18/639,170

(22) Filed: Apr. 18, 2024

(65) Prior Publication Data

US 2024/0267568 A1   Aug. 8, 2024

Related U.S. Application Data

(63) Continuation of application No. PCT/EP2021/079028, filed on Oct. 20, 2021.

(51) Int. Cl.
*H04N 19/91* (2014.01)
*G06N 7/01* (2023.01)
(Continued)

(52) U.S. Cl.
CPC .............. *H04N 19/91* (2014.11); *G06N 7/01* (2023.01); *G06V 10/44* (2022.01); *G06V 10/82* (2022.01); *H04N 19/436* (2014.11)

(58) Field of Classification Search
CPC ...... G06N 3/044; G06N 3/045; G06N 3/0455; G06N 3/0464; G06N 3/048; G06N 3/088;
(Continued)

(56) References Cited

U.S. PATENT DOCUMENTS

2021/0004670 A1* 1/2021 Tripathi ................. G06N 3/084
2021/0350244 A1* 11/2021 Kitaev .................... G06N 3/084
(Continued)

FOREIGN PATENT DOCUMENTS

AU   2024201361 A1 * 3/2024 ............. G06N 3/084
CN   111538831 A   8/2020
(Continued)

OTHER PUBLICATIONS

Chen, Tong et al. "End-to-End Learnt Image Compression via Non-Local Attention Optimization and Improved Context Modeling." IEEE transactions on image processing 30 (2021): 3179-3191. Web (Year: 2021).*
(Continued)

*Primary Examiner* — William C Vaughn, Jr.
*Assistant Examiner* — Astewaye Gettu Zewede
(74) *Attorney, Agent, or Firm* — Leydig, Voit & Mayer, Ltd.

(57) ABSTRACT

Methods and apparatuses are described for entropy encoding and decoding of a latent tensor, which includes separating the latent tensor into segments in the spatial dimensions, each segment including at least one latent tensor element. An arrangement of the segments is processed by a neural network; the neural network includes at least one attention layer. Based on the processed segment a probability model is obtained for entropy encoding or decoding of a latent tensor element.

21 Claims, 19 Drawing Sheets

(51) Int. Cl.
   *G06V 10/44*    (2022.01)
   *G06V 10/82*    (2022.01)
   *H04N 19/436*   (2014.01)

(58) Field of Classification Search
   CPC .......... G06N 7/01; G06V 10/44; G06V 10/82;
                 H04N 19/119; H04N 19/13; H04N
                 19/436; H04N 19/91
   USPC ......................................................... 375/240
   See application file for complete search history.

(56) References Cited

U.S. PATENT DOCUMENTS

| | | | | |
|---|---|---|---|---|
| 2022/0101576 | A1* | 3/2022 | Kaushik | G06F 18/214 |
| 2024/0104785 | A1* | 3/2024 | Nash | G06T 7/73 |
| 2024/0289590 | A1* | 8/2024 | Cricrì | G06N 3/084 |

FOREIGN PATENT DOCUMENTS

| | | | | |
|---|---|---|---|---|
| CN | 113347422 | A | 9/2021 | |
| CN | 113347422 | B * | 7/2022 | ............. H04N 19/13 |

OTHER PUBLICATIONS

Koyuncu et al., "Parallelized Context Modeling for Faster Image Coding," 2021 International Conference on Visual Communications and Image Processing (VCIP), Munich, Germany, doi: 10.1109/VCIP53242.2021.9675377, Total 5 pages (Dec. 2021).
Balle et al., "End-To-End Optimized Image Compression," 5th International Conference on Learning Representations, ICLR 2017, arXiv:1611.01704v3 [cs.CV], Total 27 pages (Mar. 2017).
Ma et al., "A Cross Channel Context Model for Latents in Deep Image Compression," arXiv:2103.02884v1, XP081905365, Total 14 pages (Mar. 2021).
Koyuncu et al., "Contextformer: a Transformer With Spatio-Channel Attention for Context Modeling in Learned Image Compression," arXiv:2203.02452v1 [eess.IV], Total 9 pages (Mar. 2022).
Balle et al., "Variational Image Compression With a Scale Hyperprior," Published as a conference paper at ICLR 2018, arXiv:1802.01436v2 [eess.IV], Total 23 pages (Mar. 2018).
Minnen et al., "Joint Autoregressive and Hierarchical Priors for Learned Image Compression," arXiv:1809.02736v1 [cs.CV], Total 22 pages (Sep. 2018).
Oord et al., "Conditional Image Generation with PixelCNN Decoders," arXiv:1606.05328v2 [cs. CV], Total 13 pages (Jun. 2016).
Zhou et al., "Multi-scale and Context-adaptive Entropy Model for Image Compression," arXiv:1910.07844v1 [eess.IV], Total 4 pages (Oct. 2019).
Liu et al., "Practical Stacked Non-local Attention Modules for Image Compression," Proceedings of the IEEE/CVF Conference on Computer Vision and Pattern Recognition (CVPR) Workshops, Total 4 pages (Jun. 2019).
Minnen et al., "Channel-Wise Autoregressive Entropy Models for Learned Image Compression," 2020 IEEE International Conference on Image Processing (ICIP), IEEE, arXiv:2007.08739v1 [eess.IV], Total 16 pages (Jul. 2020).
Qian et al., "Learning Accurate Entropy Model With Global Reference for Image Compression," International Conference on Learning Representations, arXiv:2010.08321v3 [eess.IV], Total 13 pages (Jan. 2022).
Guo et al., "Causal Contextual Prediction for Learned Image Compression," IEEE Transactions on Circuits and Systems for Video Technology, arXiv:2011.09704v5 [cs.CV], Total 13 pages (Oct. 2021).
Vaswani et al., "Attention is All You Need," arXiv:1706.03762v7 [cs.CL], Total 15 pages (Aug. 2023).
Parmar et al., "Image Transformer," Proceedings of the 35th International Conference on Machine Learning, arXiv:1802.05751v3 [cs.CV], Total 10 pages (Jun. 2018).
Jiang et al., "TransGAN: Two Pure Transformers Can Make One Strong GAN, and That Can Scale Up," arXiv:2102.07074v4 [cs.CV], Total 19 pages (Dec. 2021).
Dosovitskiy et al., "An Image is Worth 16×16 Words: Transformers for Image Recognition at Scale," Published as a conference paper at ICLR 2021, arXiv:2010.11929v2 [cs.CV], Total 22 pages (Jun. 2021).
Esser et al., "Taming Transformers for High-Resolution Image Synthesis," Proceedings of the IEEE/CVF Conference on Computer Vision and Pattern Recognition, Submitted Dec. 2020, Total 11 pages (Last revised Jun. 2021).
Mentzer et al., "Conditional Probability Models for Deep Image Compression," arXiv:1801.04260v4 [cs.CV], Total 19 pages (Jun. 2019).
Ladune et al., "Optical Flow and Mode Selection for Learning-based Video Coding," arXiv:2008.02580v1 [eess.IV], Total 6 pages (Aug. 2020).
Lu et al., "DVC: An End-to-end Deep Video Compression Framework," arXiv:1812.00101v3 [eess.IV], Total 14 pages (Apr. 2019).
Boev et al., "Visual quality evaluation methodology for multiview displays," Displays, vol. 33, Issue 2, doi:10.1016/j.displa.2012.01.002, Total 18 pages (Apr. 2012).
Koyuncu et al., "Contextformer: A Transformer With Spatio-Channel Attention for Context Modeling in Learned Image Compression," arXiv:2203.02452v1 [eess.IV], Total 18 pages (Mar. 2022).
Chen T. et al., "End-to-End Learnt Image Compression via Non-Local Attention Optimization and Improved Context Modeling", IEEE Transactions on Image Processing, vol. 30, total 14 pages (Feb. 19, 2021).
Chen H. et al., "Transformer Encoder With Multi-Modal Multi-Head Attention for Continuous Affect Recognition", IEEE Transactions on Multimedia, vol. 23, total 2 pages (Nov. 12, 2020).

* cited by examiner

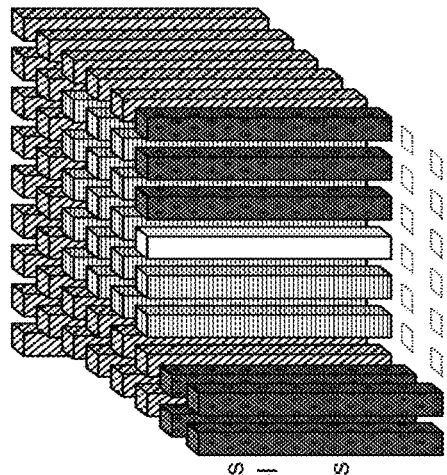
Fig. 14 a
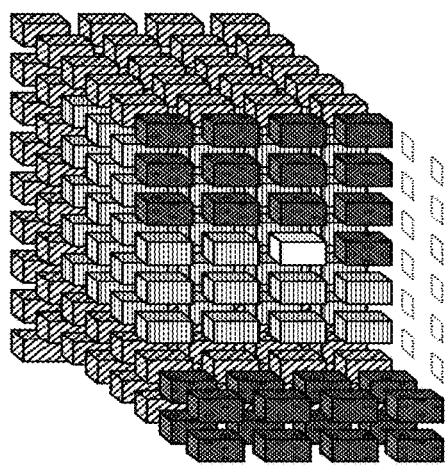
Fig. 14 b
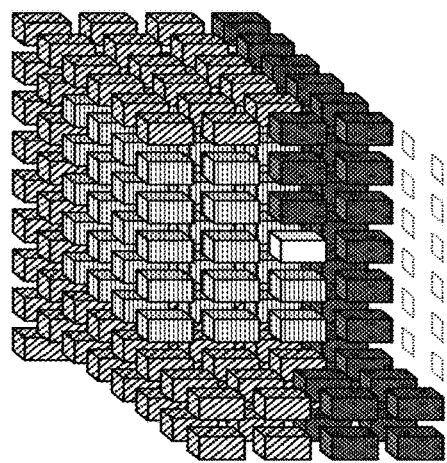
Fig. 14 c
□ Latent tensor segment currently coded
▨ Latent tensor segment previously coded
▥ Latent tensor segments used by Context Model
▦ Latent tensor segments yet to be coded
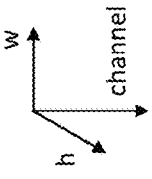

ATTENTION BASED CONTEXT MODELLING FOR IMAGE AND VIDEO COMPRESSION

CROSS-REFERENCE TO RELATED APPLICATIONS

This application is a continuation of International Application No. PCT/EP2021/079028, filed on Oct. 20, 2021, the disclosure of which is hereby incorporated by reference in its entirety.

FIELD

Embodiments of the present invention relate to the field of artificial intelligence (AI)-based video or picture compression technologies, and in particular, to context modelling using an attention layer within a neural network to process elements of a latent tensor.

BACKGROUND

Video coding (video encoding and decoding) is used in a wide range of digital video applications, for example broadcast digital TV, video transmission over internet and mobile networks, real-time conversational applications such as video chat, video conferencing, DVD and Blu-ray discs, video content acquisition and editing systems, and camcorders of security applications.

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video pictures. The compressed data is then received at the destination by a video decompression device that decodes the video data. With limited network resources and ever increasing demands of higher video quality, improved compression and decompression techniques that improve compression ratio with little to no sacrifice in picture quality are desirable.

In recent years, deep learning is gaining popularity in the fields of picture and video encoding and decoding.

SUMMARY

The embodiments of the present disclosure provide apparatuses and methods for entropy encoding and decoding of a latent tensor, which includes separating the latent tensor into segments and obtaining a probability model for the entropy encoding of a current element of the latent tensor by processing a set of elements by one or more layers of a neural network including an attention layer.

The embodiments of the invention are defined by the features of the independent claims, and further advantageous implementations of the embodiments by the features of the dependent claims.

According to an embodiment a method is provided for entropy encoding of a latent tensor, comprising: separating the latent tensor into a plurality of segments in the spatial dimensions, each segment including at least one latent tensor element; processing an arrangement of the plurality of segments by one or more layers of a neural network, including at least one attention layer; and obtaining a probability model for the entropy encoding of a current element of the latent tensor based on the processed plurality of segments.

The method considers spatial correlations in the latent tensor and spatial adaptivity for the implicit entropy estimation. The attention mechanism adaptively weights the importance of the previously coded latent segments. The contribution of the segments to the entropy modeling of the current element corresponds to their respective importance. Thus, the performance of the entropy estimation is improved.

In an exemplary implementation, the separating the latent tensor comprises separating the latent tensor into two or more segments in the channel dimension.

Separating the latent tensor into segments in the channel dimension may enable the use of cross-channel correlations for the context modelling, and thus improving the performance of the entropy estimation.

For example, the processing of the arrangement comprises arranging the segments in a predefined order, wherein segments with a same spatial coordinate are grouped together.

Such an arrangement may improve the performance of the entropy estimation by focusing on cross-channel correlations due to the related processing order.

In an exemplary implementation, the processing of the arrangement comprises arranging the segments, wherein segments, which have different spatial coordinates, are arranged consecutively in a predefined order.

Such an arrangement may improve the performance of the entropy estimation by focusing on spatial correlations due to the related processing order.

For example, the processing by the neural network comprises applying a first neural subnetwork to extract features of the plurality of segments, and providing an output of the first neural subnetwork as an input to a subsequent layer within the neural network.

Processing the input of the neural network to extract the features of the plurality of segments may enable a focus of the attention layer on independent deep features of the input.

In an exemplary implementation, the processing by the neural network further comprises: providing positional information of the plurality of segments as an input to the at least one attention layer.

The positional encodings may enable the attention layer to utilize the sequential order of the input sequence.

In an exemplary implementation, the processing an arrangement of the plurality of segments includes selecting a subset of segments from said plurality of segments; and said subset is provided as an input to a subsequent layer within the neural network.

Selecting a subset of segments may enable support for latent tensors of larger sizes by requiring a reduced size of memory and/or a reduced amount of processing.

For example, the processing by the at least one attention layer in the neural network further comprises: applying a mask, which masks elements in an attention tensor following the current element within a processing order of the latent tensor.

Applying a mask ensures, that only previously encoded elements may be processed and thus the coding order is preserved. The mask mirrors the availability of information at the decoding side to the encoding side.

In an exemplary implementation, the neural network includes a second neural subnetwork, the second neural subnetwork processing an output of the attention layer.

The neural subnetwork may process the features outputted by the attention layer to provide probabilities for the symbols used in the encoding and thus enabling an efficient encoding and/or decoding.

For example, at least one of the first neural subnetwork and the second neural subnetwork is a multilayer perceptron.

A multilayer perceptron may provide an efficient implementation of a neural network.

In an exemplary implementation, the at least one attention layer in the neural network is a multi-head attention layer.

A multi-head attention layer may improve the estimation of probabilities by processing different representations of the input in parallel and thus providing more projections and attention computations, which corresponds to various perspectives of the same input.

For example, the at least one attention layer in the neural network is included in a transformer subnetwork.

A transformer subnetwork may provide an efficient implementation of an attention mechanism.

In an exemplary implementation, the method is further comprising: padding the beginning of the arrangement of the plurality of segments with a zero segment before processing by the neural network.

A padding with zeros at the beginning of the arrangement mirrors the availability of information at the decoding side and thus causality in the coding order is preserved.

For example, the method is further comprising: entropy encoding the current element into a first bitstream using the obtained probability model.

Using the probability model obtained by processing the plurality of segments by a neural network including an attention layer may reduce the size of the bitstream.

In an exemplary implementation, the method is further comprising: quantizing the latent tensor before separating into segments.

A quantized latent tensor yields a simplified probability model, thus enabling a more efficient encoding process. Also, such latent tensor is compressed and can be processed with reduced complexity and represented more efficiently within the bitstream.

For example, the method is further comprising selecting the probability model for the entropy encoding according to: computational complexity and/or properties of the first bitstream.

Enabling the selection of the context modelling strategy may allow for better performance during the encoding process and may provide flexibility in adapting the encoded bitstream to the desired application.

In an exemplary implementation, the method is further comprising: hyper-encoding the latent tensor obtaining a hyper-latent tensor; entropy encoding the hyper-latent tensor into a second bitstream; entropy decoding the second bitstream; and obtaining a hyper-decoder output by hyper-decoding the hyper-latent tensor.

Introducing a hyper-prior model may further improve the probability model and thus the coding rate by determining further redundancy in the latent tensor.

For example, the method is further comprising: separating the hyper-decoder output into a plurality of hyper-decoder output segments, each hyper-decoder output segments including one or more hyper-decoder output elements; for each segment out of the plurality of segments, concatenating said segment and a set of hyper-decoder output segments out of the plurality of hyper-decoder output segments before obtaining the probability model.

The probability model may be further improved by concatenating the hyper-decoder output with a respective segment out of the plurality of segments.

In an exemplary implementation, the set of hyper-decoder output segments to be concatenated with a respective segment includes one or more of: a hyper-decoder output segment corresponding to said respective segment, or a plurality of hyper-decoder output segments corresponding to a same channel as said respective segment, or a plurality of hyper-decoder output segments spatially neighboring said respective segment, or a plurality of hyper-decoder output segments including neighboring segments spatially neighboring said respective segment and segments corresponding to a same channel as said neighboring segment.

The probability model may be further improved by including a respective set of hyper-decoder output segments. The behavior for performance and complexity may depend on the set of hyper-decoder output segments and the content to be encoded.

For example, the method is further comprising adaptively selecting the set of hyper-decoder output segments according to: computational complexity and/or properties of the first bitstream.

Enabling the selection of additional hyper-prior modelling strategy may allow for better performance during the encoding process and may provide flexibility in adapting the encoded bitstream to the desired application.

In an exemplary implementation, one or more of the following steps are performed in parallel for each segment out of the plurality of segments: processing by the neural network, and entropy encoding the current element.

A parallel processing of the segments may result in a faster encoding into the bitstream.

According to an embodiment, a method is provided for encoding image data comprising: obtaining a latent tensor by processing the image data with an autoencoding convolutional neural network; and entropy encoding the latent tensor into a bitstream using a generated probability model according to any of the methods described above.

The entropy coding may be readily and advantageously applied to image encoding, to effectively reduce the data rate, e.g. when transmission or storage of pictures or videos is desired, as the latent tensors for image reconstruction may still have considerable size.

According to an embodiment, a method is provided for entropy decoding of a latent tensor, comprising: initializing the latent tensor with zeroes; separating the latent tensor into a plurality of segments in the spatial dimensions, each segment including at least one latent tensor element; processing an arrangement of the plurality of segments by one or more layers of a neural network, including at least one attention layer; and obtaining a probability model for the entropy decoding of a current element of the latent tensor based on the processed plurality of segments.

The method considers spatial correlations in the latent tensor and spatial adaptivity for the implicit entropy estimation. The attention mechanism adaptively weights the importance of the previously coded latent segments. The contribution of the segments to the entropy modeling of the current element corresponds to their respective importance. Thus, the performance of the entropy estimation is improved.

In an exemplary implementation, the separating the latent tensor comprises separating the latent tensor into two or more segments in the channel dimension.

Separating the latent tensor into segments in the channel dimension may enable the use of cross-channel correlations for the context modelling, and thus improving the performance of the entropy estimation.

For example, the processing of the arrangement comprises arranging the segments in a predefined order, wherein segments with a same spatial coordinate are grouped together.

Such an arrangement may improve the performance of the entropy estimation by focusing on cross-channel correlations due to the related processing order.

In an exemplary implementation, the processing of the arrangement comprises arranging the segments, wherein segments, which have different spatial coordinates, are arranged consecutively in a predefined order.

Such an arrangement may improve the performance of the entropy estimation by focusing on spatial correlations due to the related processing order.

For example, the processing by the neural network comprises applying a first neural subnetwork to extract features of the plurality of segments, and providing an output of the first neural subnetwork as an input to a subsequent layer within the neural network.

Processing the input of the neural network to extract the features of the plurality of segments may enable a focus of the attention layer on independent deep features of the input.

In an exemplary implementation, the processing by the neural network further comprises: providing positional information of the plurality of segments as an input to the at least one attention layer.

The positional encodings may enable the attention layer to utilize the sequential order of the input sequence.

In an exemplary implementation, the processing an arrangement of the plurality of segments includes selecting a subset of segments from said plurality of segments; and said subset is provided as an input to a subsequent layer within the neural network.

Selecting a subset of segments may enable support for latent tensors of larger sizes by requiring a reduced size of memory and/or a reduced amount of processing.

In an exemplary implementation, the neural network includes a second neural subnetwork, the second neural subnetwork processing an output of the attention layer.

The neural subnetwork may process the features outputted by the attention layer to provide probabilities for the symbols used in the encoding and thus enabling an efficient encoding and/or decoding.

For example, at least one of the first neural subnetwork and the second neural subnetwork is a multilayer perceptron.

A multilayer perceptron may provide an efficient implementation of a neural network.

In an exemplary implementation, the at least one attention layer in the neural network is a multi-head attention layer.

A multi-head attention layer may improve the estimation of probabilities by processing different representations of the input in parallel and thus providing more projections and attention computations, which corresponds to various perspectives of the same input.

For example, the at least one attention layer in the neural network is included in a transformer subnetwork.

A transformer subnetwork may provide an efficient implementation of an attention mechanism.

In an exemplary implementation, the method is further comprising: padding the beginning of the arrangement of the plurality of segments with a zero segment before processing by the neural network.

A padding with zeros at the beginning of the arrangement mirrors the availability of information at the decoding side and thus causality in the coding order is preserved.

For example, the method is further comprising: entropy decoding the current element into a first bitstream using the obtained probability model.

Using the probability model obtained by processing the plurality of segments by a neural network including an attention layer may reduce the size of the bitstream.

For example, the method is further comprising selecting the probability model for the entropy encoding according to: computational complexity and/or properties of the first bitstream.

Enabling the selection of the context modelling strategy may allow for better performance during the encoding process and may provide flexibility in adapting the encoded bitstream to the desired application.

In an exemplary implementation, the method is further comprising: entropy decoding a hyper-latent tensor from a second bitstream; and obtaining a hyper-decoder output by hyper-decoding the hyper-latent tensor.

Introducing a hyper-prior model may further improve the probability model and thus the coding rate by determining further redundancy in the latent tensor.

For example, the method is further comprising: separating the hyper-decoder output into a plurality of hyper-decoder output segments, each hyper-decoder output segments including one or more hyper-decoder output elements; for each segment out of the plurality of segments, concatenating said segment and a set of hyper-decoder output segments out of the plurality of hyper-decoder output segments before obtaining the probability model.

The probability model may be further improved by concatenating the hyper-decoder output with a respective segment out of the plurality of segments.

In an exemplary implementation, the set of hyper-decoder output segments to be concatenated with a respective segment includes one or more of: a hyper-decoder output segment corresponding to said respective segment, or a plurality of hyper-decoder output segments corresponding to a same channel as said respective segment, or a plurality of hyper-decoder output segments spatially neighboring said respective segment, or a plurality of hyper-decoder output segments including neighboring segments spatially neighboring said respective segment and segments corresponding to a same channel as said neighboring segment.

The probability model may be further improved by including a respective set of hyper-decoder output segments. The behavior for performance and complexity may depend on the set of hyper-decoder output segments and the content to be encoded.

For example, the method is further comprising adaptively selecting the set of hyper-decoder output segments according to: computational complexity and/or properties of the first bitstream.

Enabling the selection of additional hyper-prior modelling strategy may allow for better performance during the encoding process and may provide flexibility in adapting the encoded bitstream to the desired application.

According to an embodiment, a method is provided for decoding image data comprising: entropy decoding a latent tensor from a bitstream according to any of the methods described above; and obtaining the image data by processing the latent tensor with an autodecoding convolutional neural network.

The entropy decoding may be readily and advantageously applied to image decoding, to effectively reduce the data rate, e.g. when transmission or storage of pictures or videos is desired, as the latent tensors for image reconstruction may still have considerable size.

In an exemplary implementation, a computer program stored on a non-transitory medium and including code instructions, which, when executed on one or more processors, cause the one or more processors to execute steps of the method according to any of the methods described above.

According to an embodiment, an apparatus is provided for entropy encoding of a latent tensor, comprising: processing circuitry configured to: separate the latent tensor into a plurality of segments in the spatial dimensions, each segment including at least one latent tensor element; process an arrangement of the plurality of segments by one or more layers of a neural network, including at least one attention layer; and obtain a probability model for the entropy encoding of a current element of the latent tensor based on the processed plurality of segments.

According to an embodiment, an apparatus is provided for entropy decoding of a latent tensor, comprising: processing circuitry configured to: initialize the latent tensor with zeroes; separate the latent tensor into a plurality of segments in the spatial dimensions, each segment including at least one latent tensor element; process an arrangement of the plurality of segments by one or more layers of a neural network, including at least one attention layer; and obtain a probability model for the entropy decoding of a current element of the latent tensor based on the processed plurality of segments.

The apparatuses provide the advantages of the methods described above.

The invention can be implemented in hardware (HW) and/or software (SW) or in any combination thereof. Moreover, HW-based implementations may be combined with SW-based implementations.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the invention are described in more detail with reference to the attached figures and drawings, in which:

FIG. 14a illustrates an exemplary processing order of segments of a latent tensor, where a subset of segments is used for context modelling;

FIG. 14b illustrates an exemplary processing order of segments of a latent tensor including a separation in the channel dimension, where segments of a same spatial coordinate are processed consecutively and a subset of segments is used for context modelling;

FIG. 14c illustrates an exemplary processing order of segments of a latent tensor including a separation in the channel dimension, where segments of a same channel segment index are processed consecutively and a subset of segments is used for context modelling;

DETAILED DESCRIPTION

Figure 1:
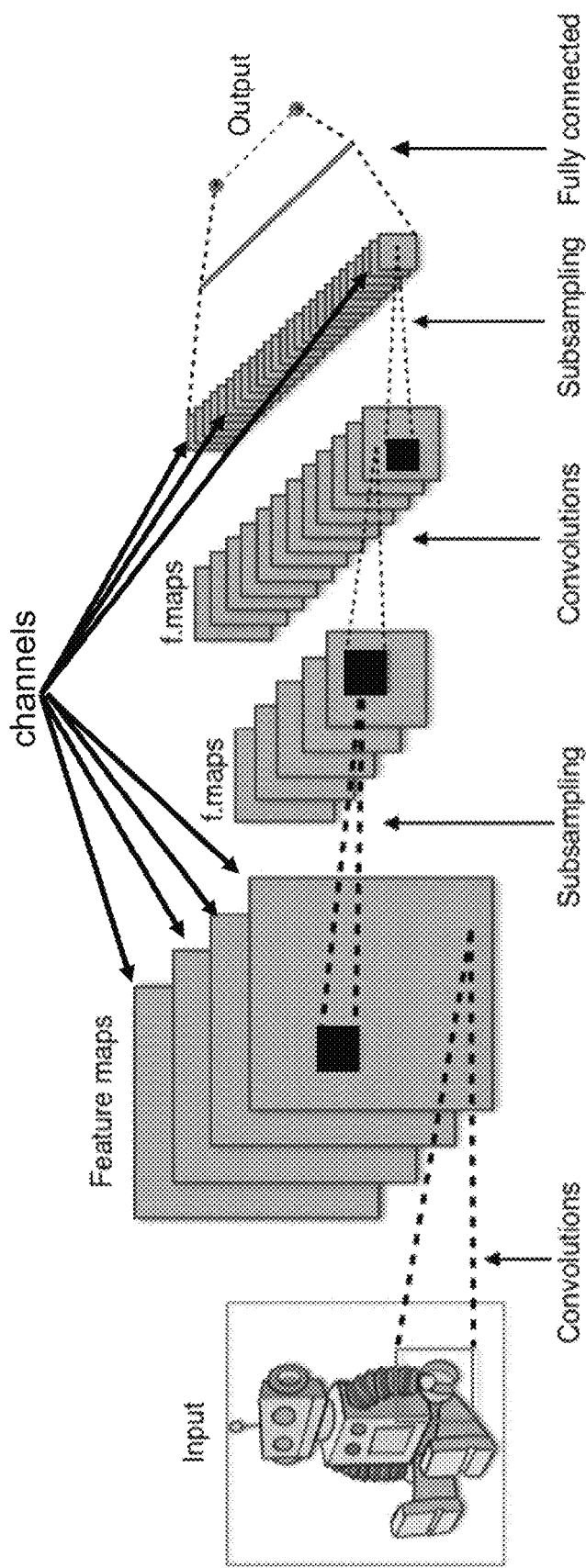
FIG. 1 is a schematic drawing illustrating channels processed by layers of a neural network.

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps is described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

In image/video compression algorithms, entropy estimation is one of the components, which provides a significant gain. The entropy estimation includes, for example, explicit entropy estimation and/or implicit entropy estimation. Explicit entropy estimation may be realized by a hyper-prior that compresses the entropy estimation parameters and sends the side-information over a second bitstream. Implicit entropy estimation may use already decoded elements of a first bitstream and includes said decoded elements in the entropy estimation of the primary bitstream while considering the causality of the coding order. The implicit entropy estimation is usually called autoregressive context model and may be typically implemented by two-dimensional (2D) masked convolutions. However, the 2D masked convolutions provide a finite small support. This limits the performance of the implicit entropy model, since the long-distant dependencies are not considered.

Additionally, once trained, convolutional kernels are inherently not adaptive to the bitstream properties, i.e., latent tensor elements. The same kernel is applied to every position in the compressed bitstream, and therefore, convolutional kernels are location-agnostic. This limits the performance of the implicit model since only location-bounded dependencies can be learned. Even when the kernel size of the masked convolutions is increased, the performance of the implicit model increases marginally, since a fixed set of location-bounded internal relations between the previously coded elements can be exploited due to the non-adaptivity.

Furthermore, an implicit model with 2D masked convolutions encodes/decodes all channels of the latent tensor at once and does not exploit any cross-channel correlations. Since there is no channel-wise autoregression, no channel element of the currently coded latent element has access to the information of the other spatially-co-located elements with different channel index. The lack of channel-wise autoregression also causes performance degradation.

Autoencoders and Unsupervised Learning

Figure 2:
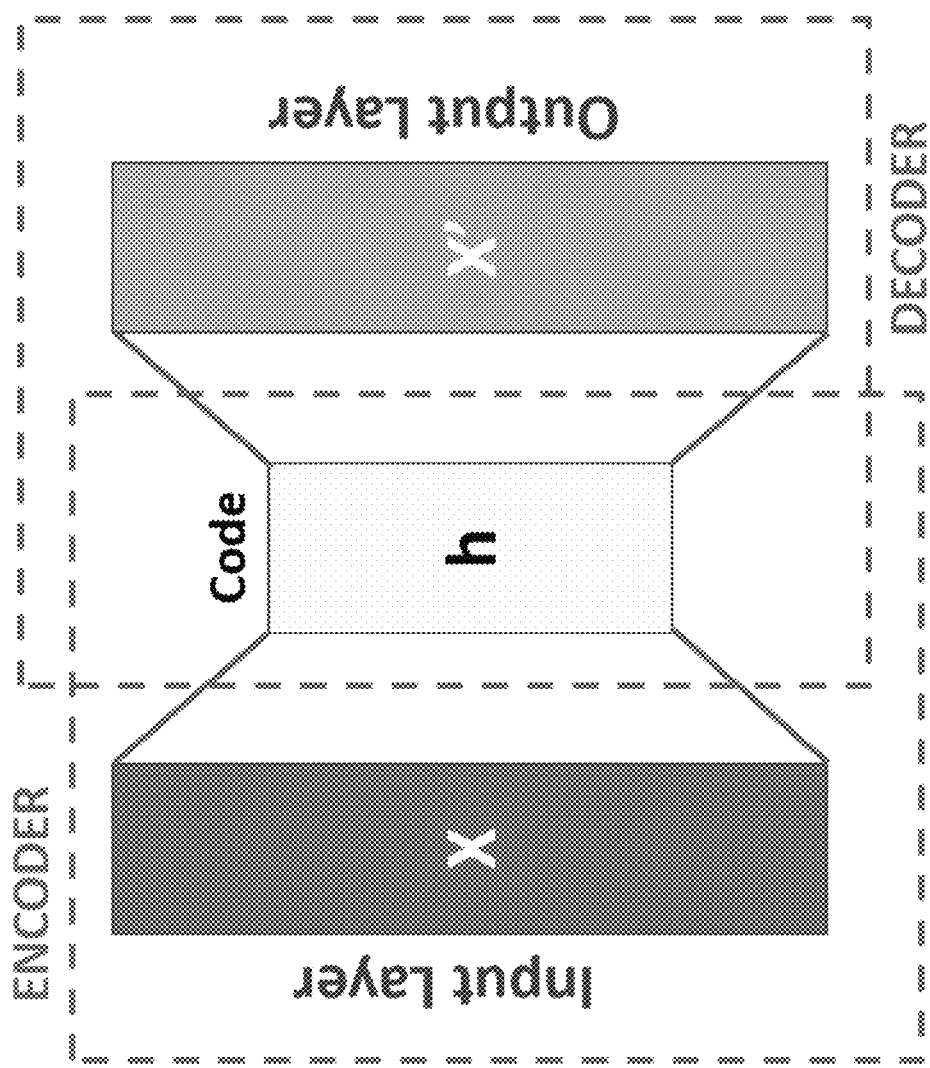
FIG. 2 is a schematic drawing illustrating an autoencoder type of a neural network.

An autoencoder is a type of artificial neural network used to learn efficient data codings in an unsupervised manner. A schematic drawing thereof is shown in FIG. 2. The aim of an autoencoder is to learn a representation (encoding) for a set of data, typically for dimensionality reduction, by training the network to ignore signal "noise". Along with the reduction side, a reconstructing side is learnt, where the autoencoder tries to generate from the reduced encoding a representation as close as possible to its original input, hence its name. In the simplest case, given one hidden layer, the encoder stage of an autoencoder takes the input x and maps it to h $$h = \sigma(Wx + b).$$

This image h is usually referred to as code, latent variables, or latent representation. Here, σ is an element-wise activation function such as a sigmoid function or a rectified linear unit. W is a weight matrix b is a bias vector. Weights and biases are usually initialized randomly, and then updated iteratively during training through Backpropagation. After that, the decoder stage of the autoencoder maps h to the reconstruction x' of the same shape as x:

$$x' = \sigma'(W'h' + b')$$

where σ', W' and b' for the decoder may be unrelated to the corresponding σ, W and b for the encoder.

Variational autoencoder models make strong assumptions concerning the distribution of latent variables. They use a variational approach for latent representation learning, which results in an additional loss component and a specific estimator for the training algorithm called the Stochastic Gradient Variational Bayes (SGVB) estimator. It assumes that the data is generated by a directed graphical model $p_\theta(x|h)$ and that the encoder is learning an approximation $q_\phi(h|x)$ to the posterior distribution $p_\theta(h|x)$ where φ and θ denote the parameters of the encoder (recognition model) and decoder (generative model) respectively. The probability distribution of the latent vector of a VAE typically matches that of the training data much closer than a standard autoencoder.

Recent progress in artificial neural networks area and especially in convolutional neural networks enables researchers' interest of applying neural networks based technologies to the task of image and video compression. For example, End-to-end Optimized Image Compression has been proposed, which uses a network based on a variational autoencoder.

Accordingly, data compression is considered as a fundamental and well-studied problem in engineering, and is commonly formulated with the goal of designing codes for a given discrete data ensemble with minimal entropy. The solution relies heavily on knowledge of the probabilistic structure of the data, and thus the problem is closely related to probabilistic source modeling. However, since all practical codes must have finite entropy, continuous-valued data (such as vectors of image pixel intensities) must be quantized to a finite set of discrete values, which introduces an error.

In this context, known as the lossy compression problem, one must trade off two competing costs: the entropy of the discretized representation (rate) and the error arising from the quantization (distortion). Different compression applications, such as data storage or transmission over limited-capacity channels, demand different rate-distortion trade-offs.

Joint optimization of rate and distortion is difficult. Without further constraints, the general problem of optimal quantization in high-dimensional spaces is intractable. For this reason, most existing image compression methods operate by linearly transforming the data vector into a suitable continuous-valued representation, quantizing its elements independently, and then encoding the resulting discrete representation using a lossless entropy code. This scheme is called transform coding due to the central role of the transformation.

For example, JPEG uses a discrete cosine transform on blocks of pixels, and JPEG 2000 uses a multi-scale orthogonal wavelet decomposition. Typically, the three components of transform coding methods—transform, quantizer, and entropy code—are separately optimized (often through manual parameter adjustment). Modern video compression standards like HEVC, VVC and EVC also use transformed representation to code residual signal after prediction. The several transforms are used for that purpose such as discrete cosine and sine transforms (DCT, DST), as well as low frequency non-separable manually optimized transforms (LFNST).

Variational Image Compression

Figure 3A:
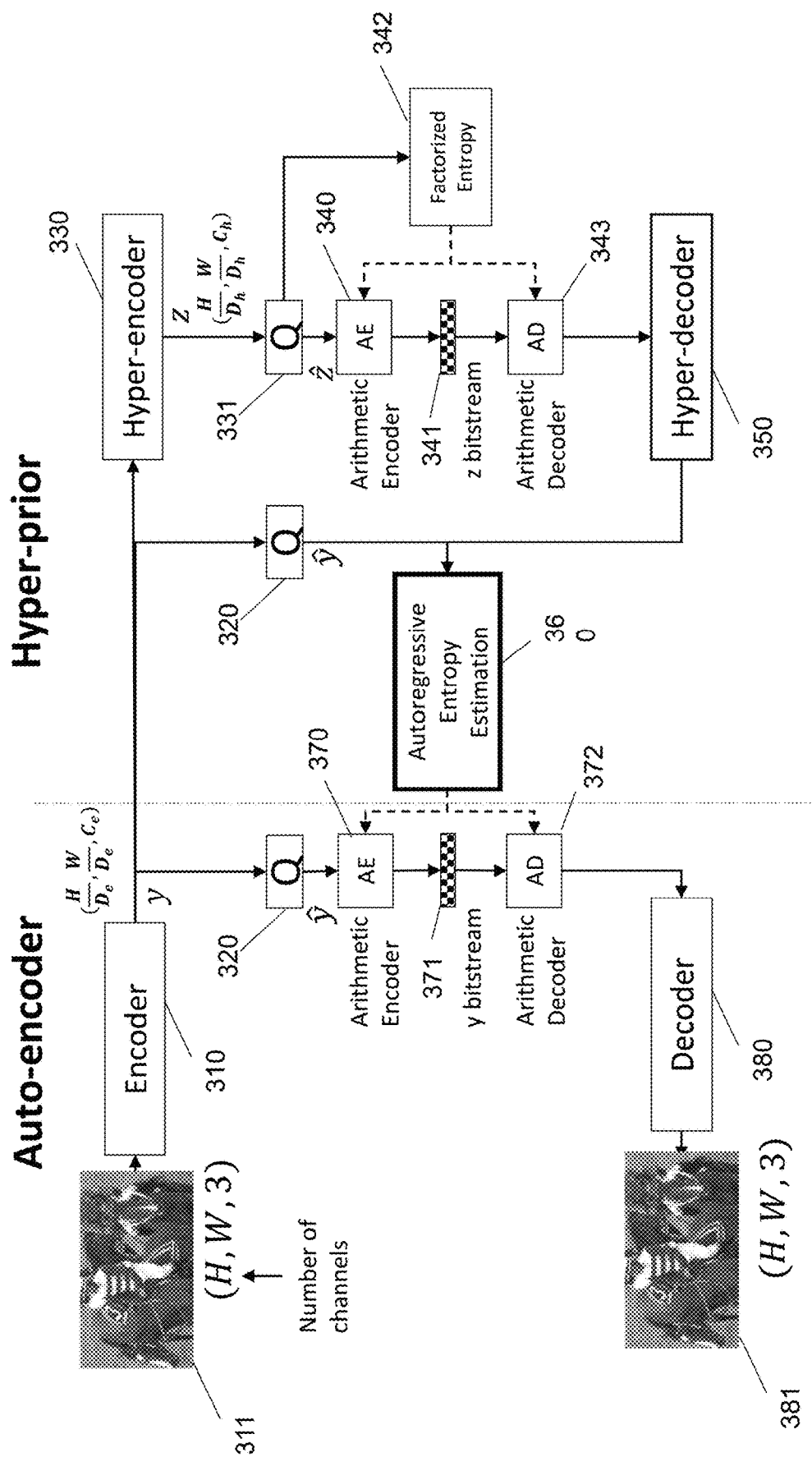
FIG. 3a is a schematic drawing illustrating an exemplary network architecture for encoder and decoder side including a hyperprior model.

Variable Auto-Encoder (VAE) framework can be considered as a nonlinear transforming coding model. The transforming process can be mainly divided into four parts: FIG. 3a exemplifies the VAE framework. In FIG. 3a, the encoder 310 maps an input image x 311 into a latent representation (denoted by y) via the function y=f (x). This latent representation may also be referred to as a part of or a point within a "latent space" in the following. The function f( ) is a transformation function that converts the input signal 311 into a more compressible representation y.

The input image 311 to be compressed is represented as a 3D tensor with the size of H×W×C, where H and W are the height and width of the image and C is the number of color channels. In a first step, the input image is passed through the encoder 310. The encoder 310 down-samples the input image 311 by applying multiple convolutions and non-linear transformations, and produces a latent-space feature tensor (latent tensor in the following) y. (While this is not a re-sampling in the classical sense, in deep learning down and up-sampling are common terms for changing the size of height and width of the tensor). The latent tensor y 4020 corresponding to the input image 4010, shown exemplarily in FIG. 4, has the size of $$\frac{H}{D_e} \times \frac{W}{D_e} \times C_e,$$

where $D_e$ is the down-sampling factor of the encoder and $C_e$ is the number of channels.

Figure 4:
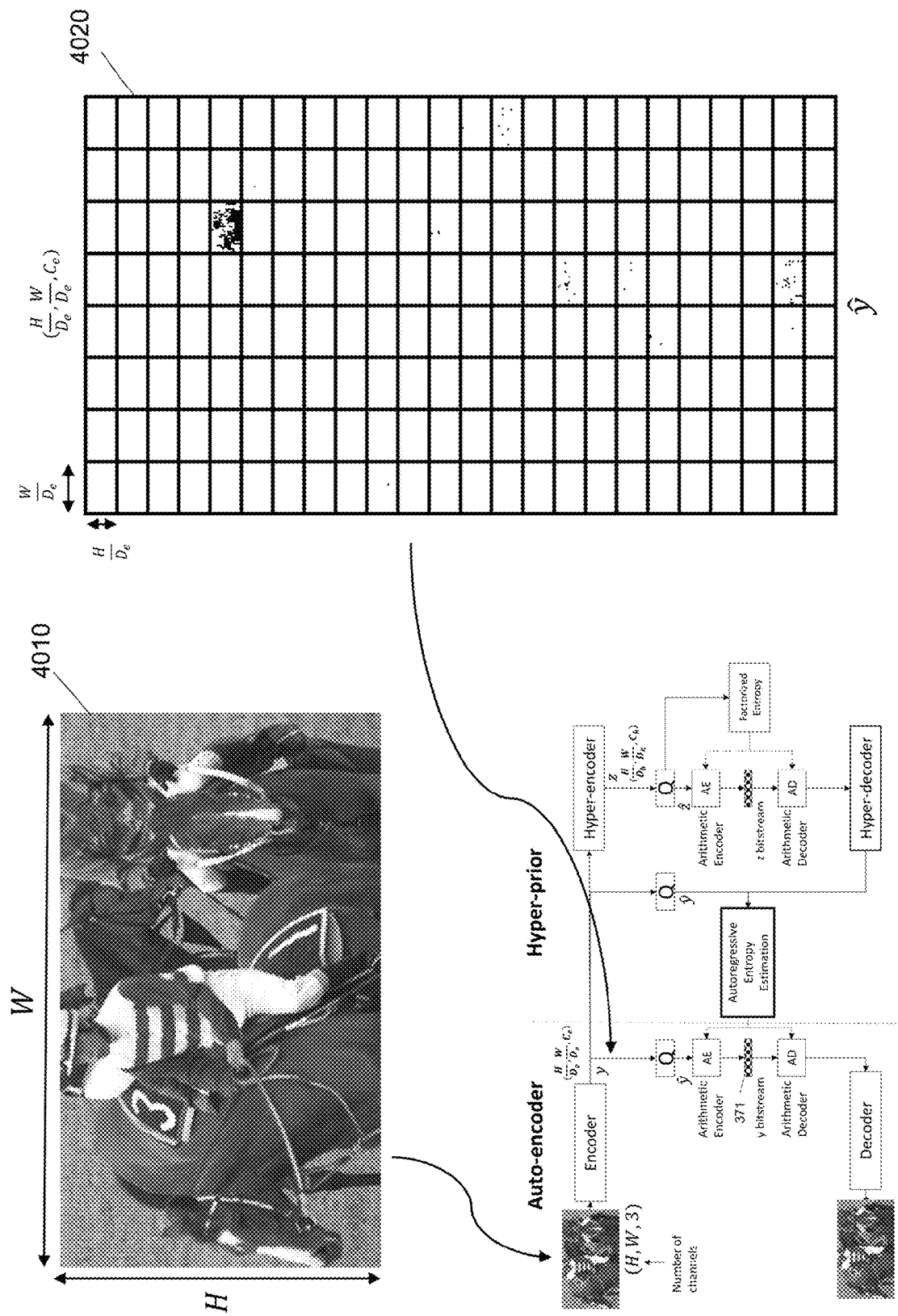
FIG. 4 is a schematic illustration of a latent tensor obtained from an input image.

The difference between the pixels of an input/output image and the latent tensor are shown in FIG. 4. The latent tensor 4020 is a multi-dimensional array of elements, which typically do not represent picture information. Two of the dimensions are associated to the height and width of the image, and information and the contents are related to lower resolution representation of the image. The third dimension, i.e. the channel dimension is related to the different representations of the same image in the latent space.

The latent space can be understood as a representation of compressed data in which similar data points are closer together in the latent space. Latent space is useful for learning data features and for finding simpler representations of data for analysis. The quantizer 330 transforms the latent representation y into the quantized latent representation $\hat{y}$ with (discrete) values by $\hat{y}=Q(y)$, with Q representing the quantizer function.

The entropy estimation of the latent tensor y may be improved by additionally applying an optional hyper-prior model.

In the first step of obtaining a hyper-prior model, a hyper-encoder 320 is applied to the latent tensor y, which down-samples the latent tensor with convolutions and non-linear transforms into a hyper-latent tensor z. The latent tensor z has the size of $$\frac{H}{D_h} \times \frac{W}{D_h} \times C_h.$$

In the next step, a quantization 331 may be performed on the latent tensor z. A factorized entropy model 342 produces an estimation of the statistical properties of the quantized hyper-latent tensor $\hat{z}$. An arithmetic encoder uses these statistical properties to create a bitstream representation 141 of the tensor $\hat{z}$. All elements of tensor $\hat{z}$ are written into the bitstream without the need of an autoregressive process.

The factorized entropy model 342 works as a codebook whose parameters are available on the decoder side. An entropy decoder 343 recovers the quantized hyper-latent tensor from the bitstream 341 by using the factorized entropy model 342. The recovered quantized hyper-latent tensor is up-sampled in the hyper-decoder 350 by applying multiple convolution operations and non-linear transformations. The hyper-decoder output tensor 430 is denoted by $\psi$.

The hyper-encoder/decoder (also known as hyper-prior) 330-350 estimates the distribution of the quantized latent representation $\hat{y}$ to get the minimum rate achievable with a lossless entropy source coding. Furthermore, a decoder 380 is provided that transforms the quantized latent representation to the reconstructed image $\hat{x}$ 381, $\hat{x}=g(\hat{y})$. The signal x is the estimation of the input image x. It is desirable that x is as close to $\hat{x}$ as possible, in other words the reconstruction quality is as high as possible. However, the higher the similarity between $\hat{x}$ and x, the higher the amount of side information necessary to be transmitted. The side information includes y bitstream and z bitstream shown in FIG. 3a, which are generated by the encoder and transmitted to the decoder. Normally, the higher the amount of side information, the higher the reconstruction quality. However, a high amount of side information means that the compression ratio is low. Therefore, one purpose of the system described in FIG. 3a is to balance the reconstruction quality and the amount of side information conveyed in the bitstream.

In FIG. 3a the component AE 370 is the Arithmetic Encoding module, which converts samples of the quantized latent representation $\hat{y}$ and the side information $\hat{z}$ into binary representations, y bitstream and z bitstream respectively. The samples of $\hat{y}$ and $\hat{z}$ might for example comprise integer or floating point numbers. One purpose of the arithmetic encoding module is to convert (via the process of binarization) the sample values into a string of binary digits (which is then included in the bitstream that may comprise further portions corresponding to the encoded image or further side information).

The arithmetic decoding (AD) 372 is the process of reverting the binarization process, where binary digits are converted back to sample values. The arithmetic decoding is provided by the arithmetic decoding module 372.

In FIG. 3*a* there are two sub networks concatenated to each other. A subnetwork in this context is a logical division between the parts of the total network. For example, in FIG. 3*a* the modules 310, 320, 370, 372 and 380 are called the "Encoder/Decoder" subnetwork. The "Encoder/Decoder" subnetwork is responsible for encoding (generating) and decoding (parsing) of the first bitstream "y bitstream". The second network in FIG. 3*a* comprises modules 330, 331, 340, 343, 350 and 360 and is called "hyper encoder/decoder" subnetwork. The second subnetwork is responsible for generating the second bitstream "z bitstream". The purposes of the two subnetworks are different.

The first subnetwork is responsible for:
the transformation 310 of the input image 311 into its latent representation y (which is easier to compress that x),
quantizing 320 the latent representation y into a quantized latent representation ŷ,
compressing the quantized latent representation ŷ using the AE by the arithmetic encoding module 370 to obtain bitstream "y bitstream",".
parsing the y bitstream via AD using the arithmetic decoding module 372, and
reconstructing 380 the reconstructed image 381 using the parsed data.

The purpose of the second subnetwork is to obtain statistical properties (e.g. mean value, variance and correlations between samples of y bitstream) of the samples of "y bitstream", such that the compressing of y bitstream by first subnetwork is more efficient. The second subnetwork generates a second bitstream "z bitstream", which comprises the said information (e.g. mean value, variance and correlations between samples of y bitstream).

The second network includes an encoding part which comprises transforming 330 of the quantized latent representation ŷ into side information z, quantizing the side information z into quantized side information ẑ, and encoding (e.g. binarizing) 340 the quantized side information ẑ into z bitstream. In this example, the binarization is performed by an arithmetic encoding (AE). A decoding part of the second network includes arithmetic decoding (AD) 343, which transforms the input z bitstream into decoded quantized side information ẑ'. The ẑ' might be identical to ẑ, since the arithmetic encoding and decoding operations are lossless compression methods. The decoded quantized side information ẑ' is then transformed 350 into decoded side information ŷ'. ŷ' represents the statistical properties of ŷ (e.g. mean value of samples of ŷ, or the variance of sample values or like). The decoded latent representation ŷ' is then provided to the above-mentioned Arithmetic Encoder 370 and Arithmetic Decoder 372 to control the probability model of ŷ.

The FIG. 3*a* describes an example of VAE (variational auto encoder), details of which might be different in different implementations. For example in a specific implementation additional components might be present to more efficiently obtain the statistical properties of the samples of the first bitstream. In one such implementation a context modeler might be present, which targets extracting cross-correlation information of the y bitstream. The statistical information provided by the second subnetwork might be used by AE (arithmetic encoder) 370 and AD (arithmetic decoder) 372 components.

FIG. 3*a* depicts the encoder and decoder in a single figure. As is clear to those skilled in the art, the encoder and the decoder may be, and very often are, embedded in mutually different devices.

Figure 3B:
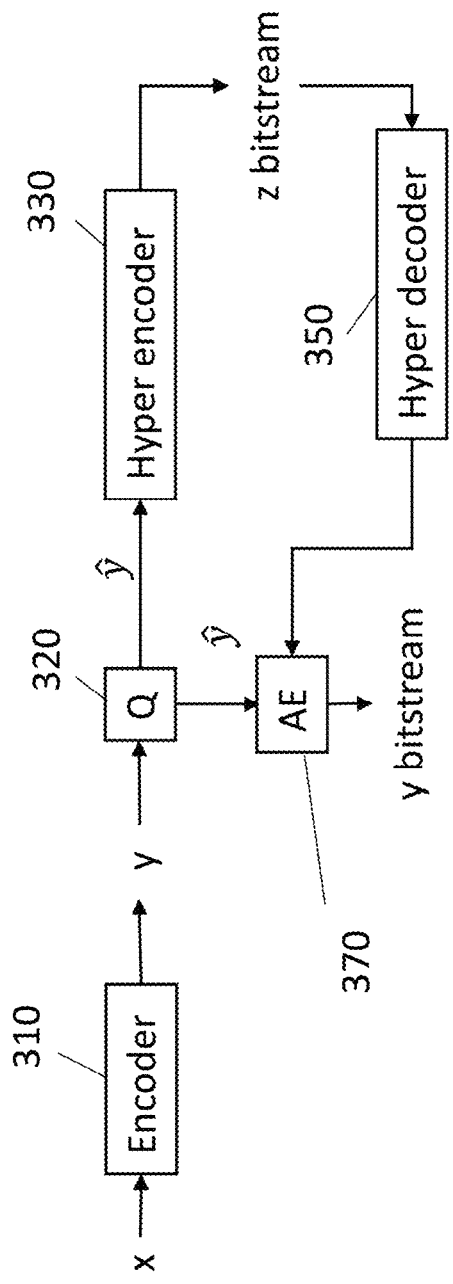
FIG. 3b is a schematic drawing illustrating a general network architecture for encoder side including a hyperprior model.
Figure 3C:
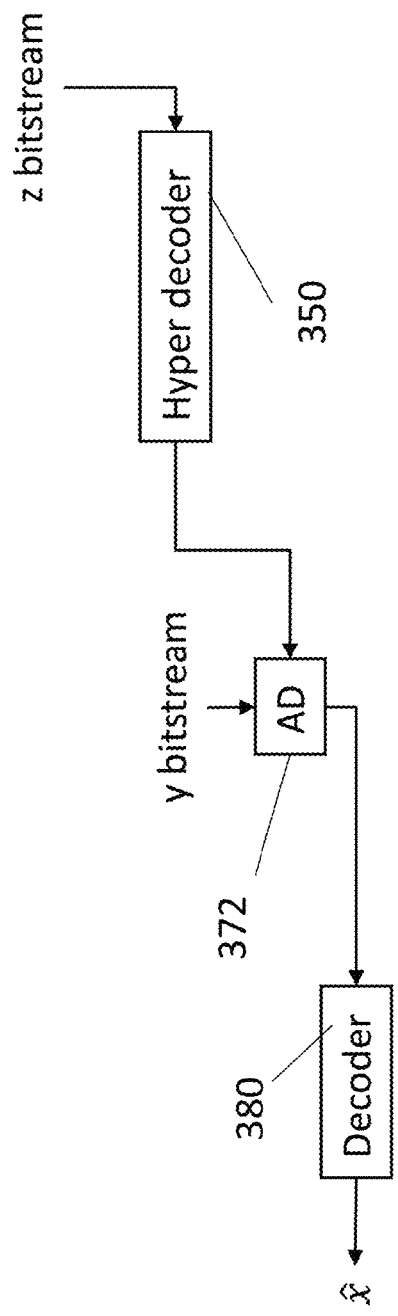
FIG. 3c is a schematic drawing illustrating a general network architecture for decoder side including a hyperprior model.

FIG. 3*b* depicts the encoder and FIG. 3*c* depicts the decoder components of the VAE framework in isolation. As input, the encoder receives, according to some embodiments, a picture. The input picture may include one or more channels, such as color channels or other kind of channels, e.g. depth channel or motion information channel, or the like. The output of the encoder (as shown in FIG. 3*b*) is a y bitstream and a z bitstream. The y bitstream is the output of the first sub-network of the encoder and the z bitstream is the output of the second subnetwork of the encoder.

Similarly, in FIG. 3*c*, the two bitstreams, y bitstream and z bitstream, are received as input and ẑ, which is the reconstructed (decoded) image, is generated at the output. As indicated above, the VAE can be split into different logical units that perform different actions. This is exemplified in FIGS. 3*b* and 3*c* so that FIG. 3*b* depicts components that participate in the encoding of a signal, like a video and provided encoded information. This encoded information is then received by the decoder components depicted in FIG. 3*c* for encoding, for example. It is noted that the components of the encoder and decoder denoted with may correspond in their function to the components referred to above in FIG. 3*a*.

Specifically, as is seen in FIG. 3*b*, the encoder comprises the encoder 310 that transforms an input x into a signal y which is then provided to the quantizer 320. The quantizer 320 provides information to the arithmetic encoding module 370 and the hyper-encoder 330. The hyper-encoder 330 may receive the signal y instead of the quantized version. The hyper-encoder 330 provides the z bitstream already discussed above to the hyper-decoder 350 that in turn provides the information to the arithmetic encoding module 370. The substeps as discussed above with reference to FIG. 3*a* may also be part of this encoder.

The output of the arithmetic encoding module is the y bitstream. The y bitstream and z bitstream are the output of the encoding of the signal, which are then provided (transmitted) to the decoding process. Although the unit 310 is called "encoder", it is also possible to call the complete subnetwork described in FIG. 3*b* "encoder". The process of encoding in general means the unit (module) that converts an input to an encoded (e.g. compressed) output. It can be seen from FIG. 3*b*, that the unit 310 can be actually considered as a core of the whole subnetwork, since it performs the conversion of the input x into y, which is the compressed version of the x. The compression in the encoder 310 may be achieved, e.g. by applying a neural network, or in general any processing network with one or more layers. In such network, the compression may be performed by cascaded processing including downsampling, which reduces size and/or number of channels of the input. Thus, the encoder may be referred to, e.g. as a neural network (NN) based encoder, or the like.

The remaining parts in the figure (quantization unit, hyper-encoder, hyper-decoder, arithmetic encoder/decoder) are all parts that either improve the efficiency of the encoding process or are responsible for converting the compressed output y into a series of bits (bitstream). Quantization may be provided to further compress the output of the NN encoder 310 by a lossy compression. The AE 370 in combination with the hyper-encoder 330 and hyper-decoder 350 used to configure the AE 370 may perform the binarization, which may further compress the quantized signal by a lossless compression. Therefore, it is also possible to call the whole subnetwork in FIG. 3b an "encoder".

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since the y has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

The arithmetic encoder and decoder are specific implementations of entropy coding. AE and AD can be replaced by any other means of entropy coding. Also, the quantization operation and a corresponding quantization unit is not necessarily present and/or can be replaced with another unit.

Artificial Neural Networks

Artificial neural networks (ANN) or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labeled as "cat" or "no cat" and using the results to identify cats in other images. They do this without any prior knowledge of cats, for example, that they have fur, tails, whiskers and cat-like faces. Instead, they automatically generate identifying characteristics from the examples that they process.

An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it.

In ANN implementations, the "signal" at a connection is a real number, and the output of each neuron is computed by some non-linear function of the sum of its inputs. The connections are called edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals travel from the first layer (the input layer), to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision, speech recognition, machine translation, social network filtering, playing board and video games, medical diagnosis, and even in activities that have traditionally been considered as reserved to humans, like painting.

The name "convolutional neural network" (CNN) indicates that the network employs a mathematical operation called convolution. Convolution is a specialized kind of linear operation. Convolutional networks are neural networks that use convolution in place of a general matrix multiplication in at least one of their layers.

FIG. 1 schematically illustrates a general concept of processing by a neural network such as the CNN. A convolutional neural network consists of an input and an output layer, as well as multiple hidden layers. Input layer is the layer to which the input (such as a portion of an image as shown in FIG. 1) is provided for processing. The hidden layers of a CNN typically consist of a series of convolutional layers that convolve with a multiplication or other dot product. The result of a layer is one or more feature maps (f.maps in FIG. 1), sometimes also referred to as channels. There may be a subsampling involved in some or all of the layers. As a consequence, the feature maps may become smaller, as illustrated in FIG. 1. The activation function in a CNN is usually a ReLU (Rectified Linear Unit) layer, and is subsequently followed by additional convolutions such as pooling layers, fully connected layers and normalization layers, referred to as hidden layers because their inputs and outputs are masked by the activation function and final convolution. Though the layers are colloquially referred to as convolutions, this is only by convention. Mathematically, it is technically a sliding dot product or cross-correlation. This has significance for the indices in the matrix, in that it affects how the weight is determined at a specific index point.

When programming a CNN for processing images, as shown in FIG. 1, the input is a tensor with shape (number of images)×(image width)×(image height)×(image depth). Then after passing through a convolutional layer, the image becomes abstracted to a feature map, with shape (number of images)×(feature map width)×(feature map height)×(feature map channels). A convolutional layer within a neural network should have the following attributes. Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to feasibly process efficiently at scale with full connectivity. In addition, such network architecture does not take into account the spatial structure of data, treating input pixels, which are far apart in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are specifically designed to emulate the behavior of a visual cortex. These models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when it detects some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers, it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum.

Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 at every depth slice in the input by 2 along both width and height, discarding 75% of the activations. In this case, every max operation is over 4 numbers. The depth dimension remains unchanged. In addition to max pooling, pooling units can use other functions, such as average pooling or l2-norm pooling. Average pooling was often used historically but has recently fallen out of favor compared to max pooling, which often performs better in practice. Due to the aggressive reduction in the size of the representation, there is a recent trend towards using smaller filters or discarding pooling layers altogether. "Region of Interest" pooling (also known as ROI pooling) is a variant of max pooling, in which output size is fixed and input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" (including calculating of a loss function) specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

In summary, FIG. 1 shows the data flow in a typical convolutional neural network. First, the input image is passed through convolutional layers and becomes abstracted to a feature map comprising several channels, corresponding to a number of filters in a set of learnable filters of this layer. Then, the feature map is subsampled using e.g. a pooling layer, which reduces the dimension of each channel in the feature map. Next, the data comes to another convolutional layer, which may have different numbers of output channels. As was mentioned above, the number of input channels and output channels are hyper-parameters of the layer. To establish connectivity of the network, those parameters need to be synchronized between two connected layers, such that the number of input channels for the current layers should be equal to the number of output channels of the previous layer. For the first layer, which processes input data, e.g. an image, the number of input channels is normally equal to the number of channels of data representation, for instance 3 channels for RGB or YUV representation of images or video, or 1 channel for grayscale image or video representation.

Attention Mechanism in Deep Learning

Attention mechanism is a deep learning technique, which allows neural network to enhance or to focus on important parts of the input and fade out unrelated parts. This simple yet powerful concept can be applied, for example, in any of the fields of natural language processing, recommendation, healthcare analytics, image processing, or speech recognition.

Originally, attention is computed over the entire input sequence (global attention). Despite its simplicity, such an approach may be computationally expensive. Using local attention may be a solution.

Figure 5B:
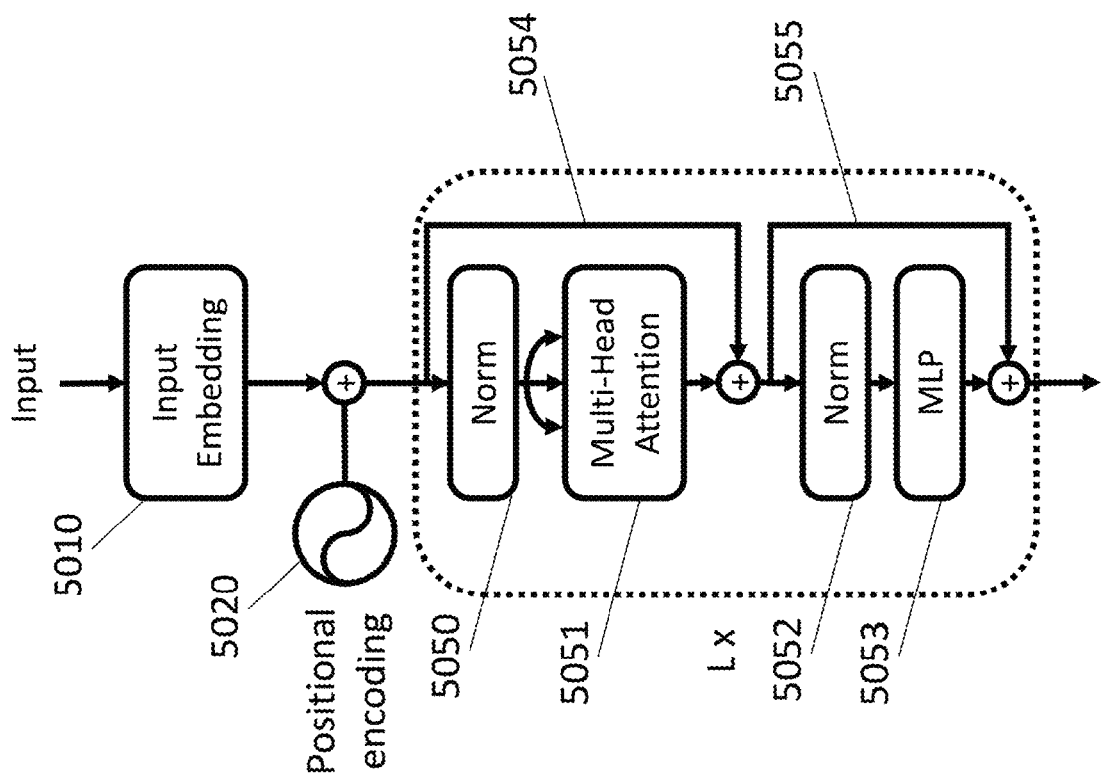
FIG. 5b shows a second exemplary implementation of a transformer network.
Figure 5A:
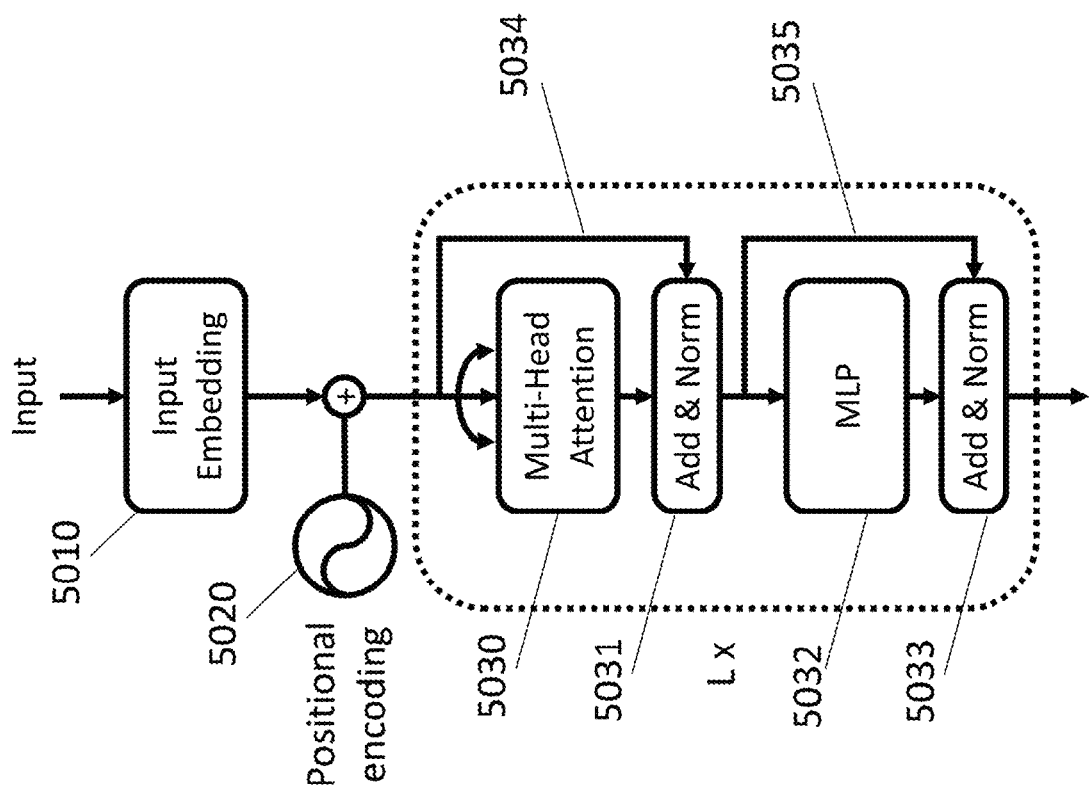
FIG. 5a shows a first exemplary implementation of a transformer network.

One exemplary implementation of the attention-mechanism is the so-called transformer model. A transformer model applies an attention layer followed by a feed-forward neural network. Two exemplary implementations of a transformer block are shown in FIGS. 5a and 5b. In the transformer model, an input tensor x is first fed to a neural network layer in order to extract features of the input tensor. Thereby a so-called embedding tensor e 5010 is obtained, which includes the latent space elements that are used as an input to a transformer. The input tensor x and embedding tensor e have the size of $S \times d_{input}$, and $S \times d_e$, where S is the number of sequential elements and d is the dimensionality of the each sequential element. Positional encodings 5020 may be added to the embedding tensors. The positional encodings 5020 enable a transformer to take into account a sequential order of the input sequence. Such a positional encoding provides a representation of the position of an element within an arrangement of the elements of the input tensor.

These encodings may be learned or pre-defined tensors may represent the order of the sequence.

When the positional encoding 5020 is calculated, it is piece-wisely added to the embedded vectors 5010. Then the input vectors are prepared to enter the transformer block. The exemplary implementing of a transformer block in FIG. 5a consists of two consequential steps: multi-head attention 5030 and linear transformation 5032 with non-linear activation function applied to each position separately and identically. Two blocks of adding and normalizing 5031 and 5033 combine the respective outputs of the attention layer 5030 and the MLP 5032 with residual connections 5034 and 5035. The exemplary implementing of a transformer block in FIG. 5b consists also of two consequential steps: multi-head attention 5051 and linear transformation 5053 with non-linear activation function applied to each position separately and identically. The exemplary implementation of FIG. 5b shows a different arrangement of the normalization blocks 5050 and 5052 and residual connections 5054 and 5055. The role of the attention blocks here is similar to recurrent cells, however, with less computational requirements. The transformer blocks do not necessarily need to use a multi-head attention layer or L times a multi-head attention layer. The multi-head attention layer(s) in these examples may be replaced by any other type of attention mechanism.

In a self-attention module, all three vectors come from the same sequence and represent vectors with positional encoding built in.

A generic attention mechanism, which consists of the queries Q 620, keys K 621 and values V 622, is shown exemplarily in FIG. 6. The origin of such naming can be found in search engines, where a user's query is matched against internal engine's keys and the result is represented by several values.

After combining the embedding vector with the positional encodings $p_e$, three different representations namely Queries Q, Keys K and Values V are obtained by a feed-forward neural network layers. Queries, Keys and Values have the size of $S \times d_q$, $S \times d_k$ and $S \times d_v$ respectively. Typically, Queries, Keys and Values may have the same dimensionality d. In order to calculate self-attention, first the scaled dot-product between Queries and Keys $$\left(\frac{QK^T}{d_k}\right)$$

may be calculated, and the softmax function may be applied to obtain attention scores. Next, these scores are multiplied with the Values to achieve self-attention. The self-attention mechanism can be formulated as:

$$\text{Attention}(Q, K, V) = \text{softmax}\left(\frac{QK^T}{d_k}\right)V,$$

where the $d_k$ is the dimensionality of the keys and $$\text{softmax}\left(\frac{QK^T}{d_k}\right)$$

has the size of $S \times S$.

Afterwards, the calculated attention is added to the embedding vector by creating a form of residual connection, and normalized with a normalization layer. Finally, a multilayer feed-forward neural network (a.k.a. multilayer perceptron) with a residual connection is applied and final output is normalized. All the above mentioned steps (after creating the embedding tensor) describes one layer of the transformer which can be repeated for L times to create a transformer network with L layers.

In other words, an attention layer obtains a plurality of representations of an input sequence, for example the Keys, Queries and Values. To obtain a representation out of said plurality representations, the input sequence is processed by a respective set of weights. This set of weights may be obtained in a training phase. These set of weights may be learned jointly with the remaining parts of a neural network including such an attention layer. During inference, the output is computed as the weighted sum of the processed input sequence.

One extension to the above mentioned attention mechanism is the multi-head attention. In this version, the final dimension of the queries, keys and values are split into h sub-representations, and for each sub-representation the attention is calculated separately. The final attention is calculated by concatenating each sub-attention and feeding it to a feed forward neural network (FFN). The formulation of the multi-head attention is given as:

$$MultiHeadAttention(Q, K, V) =$$
$$FFN(concat(\text{Attention}_1(Q_1, K_1, V_1), \ldots, \text{Attention}_h(Q_h, K_h, V_h)))$$
$$\text{Attention}_i(Q_i, K_i, V_i) = \text{softmax}\left(\frac{Q_i K_i^T}{d_{k,i}}\right)V_i$$

where $Q_i$, $K_i$ and $V_i$ have the size of $$S \times \frac{d_q}{h}, S \times \frac{d_k}{h} \text{ and } S \times \frac{d_v}{h},$$

respectively.

The multi-head attention enables parallelization and each embedding tensor to have multiple representations.

Figure 6B:
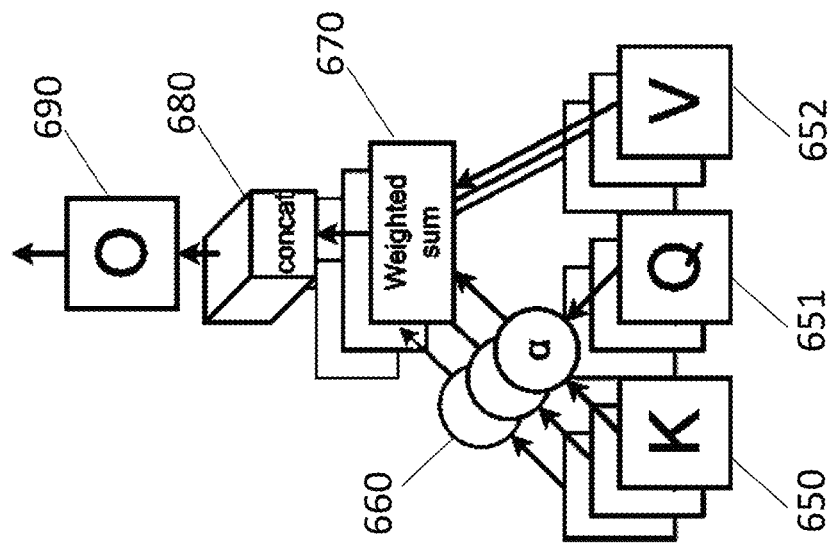
FIG. 6b is a schematic drawing illustrating a multi-head attention network.
Figure 6A:
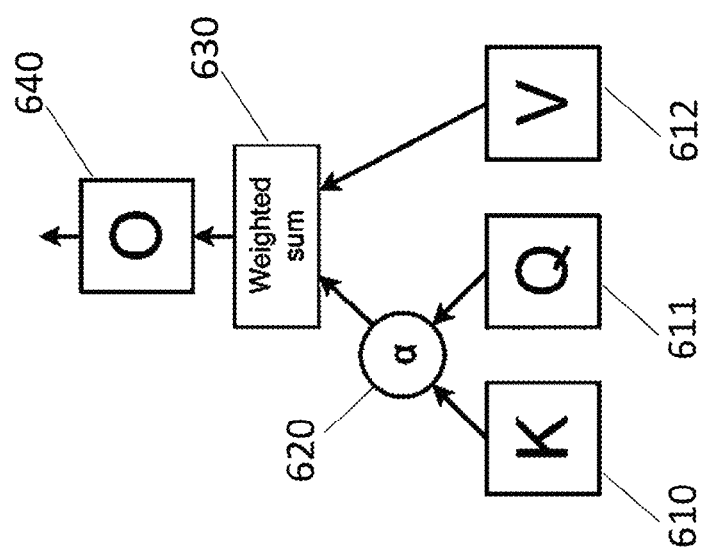
FIG. 6a is a schematic drawing illustrating an attention network.

A single attention function is illustrated in FIG. 6a and the parallel application in multi-head attention is shown in FIG. 6b. By doing more projections and attention computations, the model is enabled to have various perspectives of the same input sequence. It jointly attends to information from different angles, which is mathematically expressed via different linear subspaces.

The exemplary single attention function in FIG. 6a performs, as explained above, an alignment 620 between the Keys 610 and the Queries 611, and obtains an output 640 by applying a weighted sum 630 to the attention score and the Values 612. The exemplary multi-head attention in FIG. 6b performs an alignment 660 for each pair of Keys 650 and Queries 651. Each pair may belong to a different linear subspace. For each obtained attention score and the respective Value 652 a weighted sum 670 is calculated. The results are concatenated 680 to obtain an output 690.

The next step after Multi-Head attention in the transformer block is a simple position-wise fully connected feed-forward network. There is a residual connection around each block, which is followed by a layer normalization. The residual connections help the network to keep track of data it looks at. Layer normalization plays a role in reducing features variance.

There are several different architecture for transformers in the literature, which may differ in the order and type of its components. However, the fundamental logic is similar where some type of attention mechanism followed by another neural network encapsulates a layer of a transformer layer and multiple layers of this architecture forms a transformer network. Two examples are given in FIG. 5a and FIG. 5b as explained above. The present invention is not limited to said exemplary implementations of the attention mechanism.

Attention Based Context Modelling

Figure 7B:
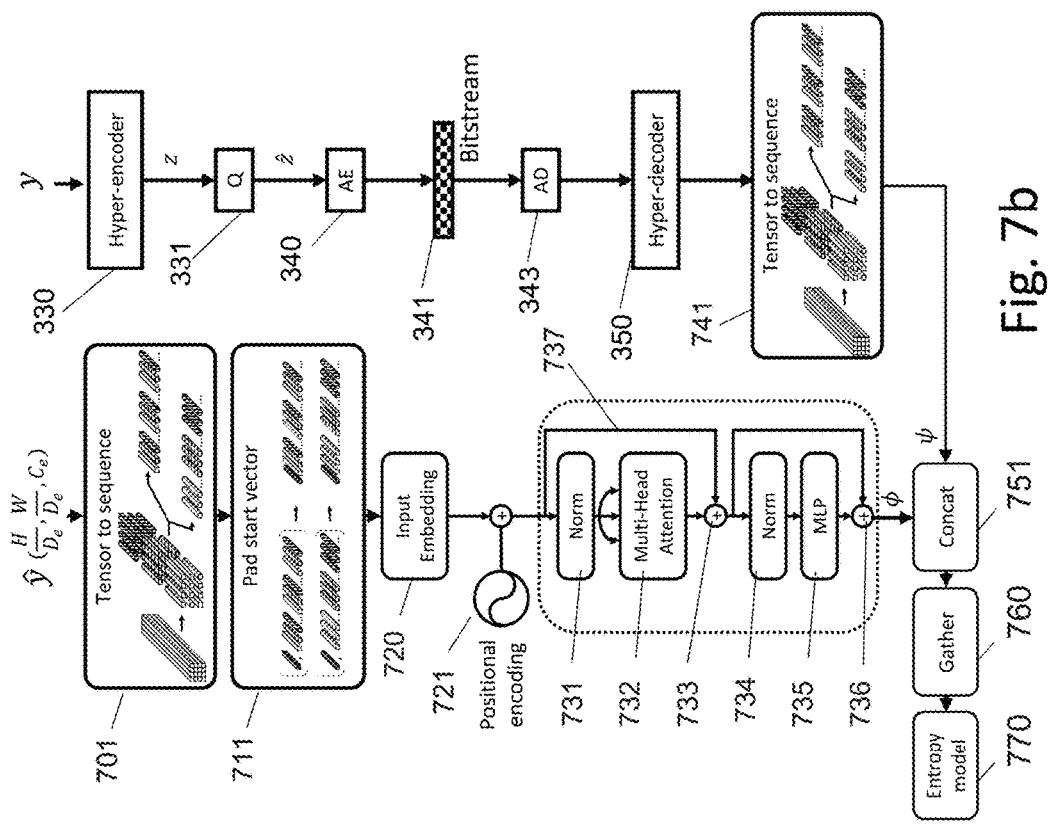
FIG. 7b shows an exemplary implementation of context modelling using an attention and an arrangement according to the second exemplary embodiment or to the third exemplary embodiment.
Figure 7A:
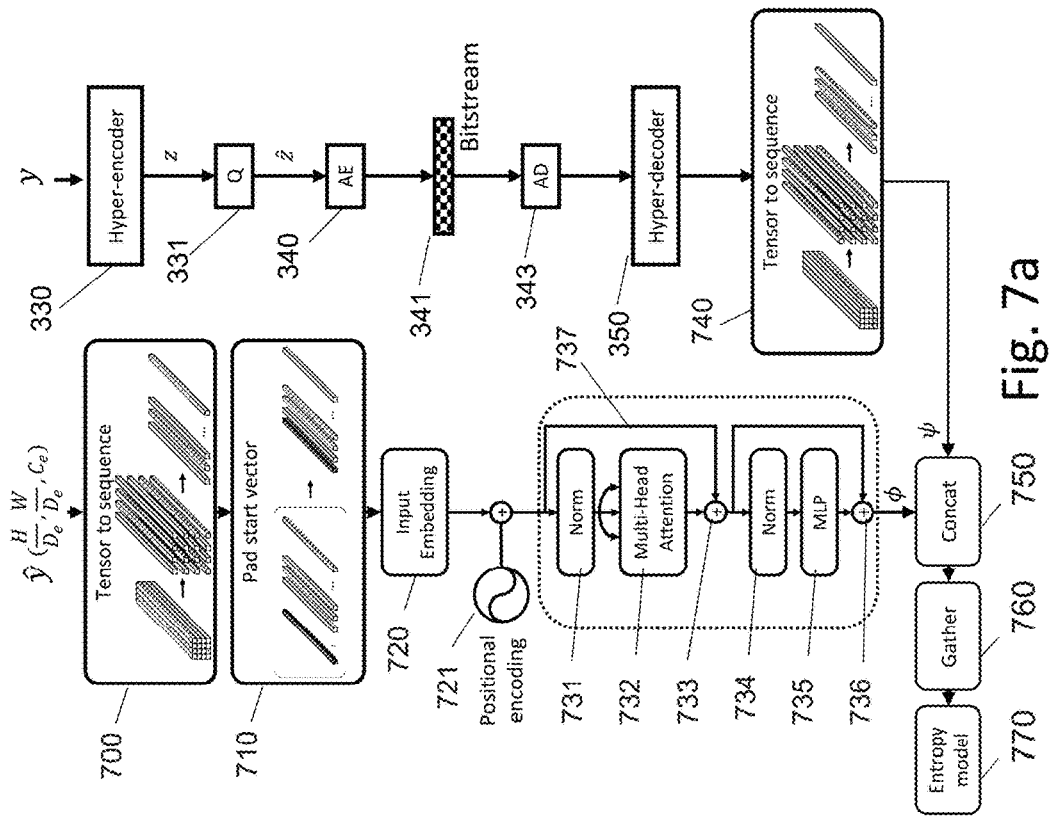
FIG. 7a shows an exemplary implementation of context modelling using an attention and an arrangement according to the first exemplary embodiment.

The process of obtaining a context model by applying a neural network including an attention layer is shown exemplarily in FIGS. 7a and b.

Image data to be compressed may be represented as a three-dimensional tensor 311 with the size of H×W×C where H and W are the height and width of the image and C is the number of color channels. The input image may be processed by an autoencoding convolutional neural network 310 as explained above with reference to FIG. 3a. Such an autoencoder 310 down-samples the input image by applying multiple convolutions and non-linear transformations, and produces a latent tensor y. The latent tensor y has the size of $$\frac{H}{D_e} \times \frac{W}{D_e} \times C_e,$$

whereas $D_e$ is the down-sampling factor of the encoder 310 and $C_e$ is the number of channels. The obtained latent tensor may be encoded into a bitstream 371 using a probability model generated by attention based context modelling.

The latent tensor y may be quantized. The quantizing may be performed by the quantizing block 320.

Figure 8:
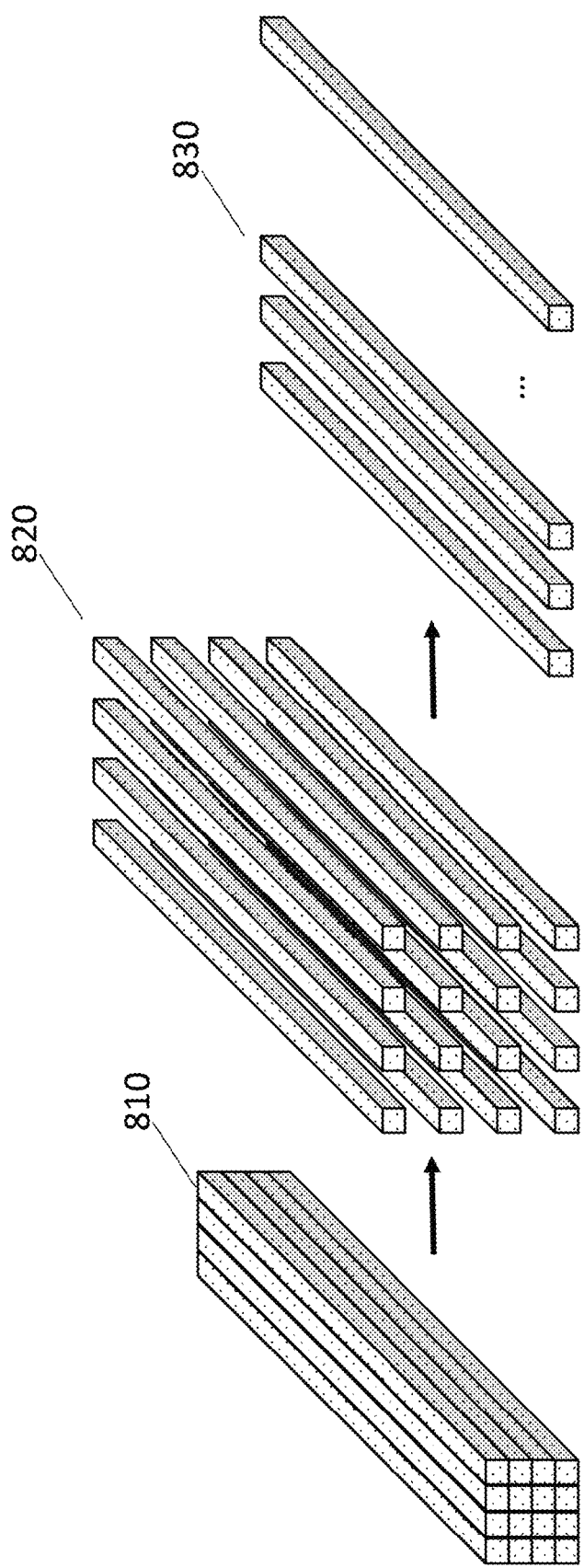
FIG. 8 shows an exemplary separation of a latent tensor into segments and an exemplary arrangement of said segments.

A context model for an entropy encoding of a latent tensor may be determined by applying an attention layer 732. The latent-space feature tensor, which includes one or more elements, is separated 700 into a plurality of segments 820 in the spatial dimensions as shown in FIGS. 7a and 8. Each segment includes at least one latent tensor element. A segment may have dimensions ($p_H \times p_W \times C_e$), where $C_e$ is the number of elements in the channel dimension of the latent tensor and the spatial dimensions of the latent tensor are split into patches, each patch including ($p_H \times p_W$) elements. The separation 700 is exemplarily shown in FIG. 8 where the exemplary 4× 4× $C_e$-dimensional latent tensor 810 is split into sixteen segments 820 in the spatial dimensions, each segment having dimension (1× 1× $C_e$).

The latent tensor to be entropy encoded may arise from image data processed by an autoencoding neural network as explained above. However, the present invention is not limited to image data from autoencoders. The latent tensor to be entropy encoded may also arise during processing any other type of input date, such as of a multi-dimensional point clouds, audio data, video data or the like.

Figure 13:
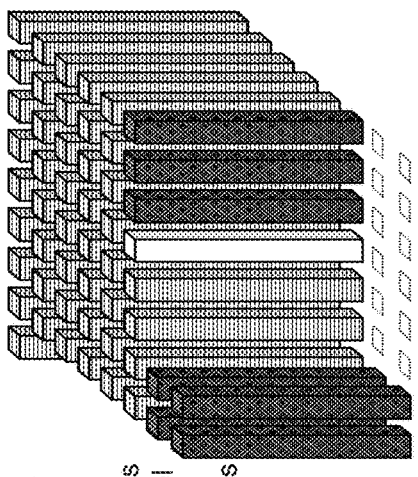
FIG. 13a illustrates an exemplary processing order of segments of a latent tensor.
FIG. 13b illustrates an exemplary processing order of segments of a latent tensor including a separation in the channel dimension, where segments of a same spatial coordinate are processed consecutively.
FIG. 13c illustrates an exemplary processing order of segments of a latent tensor including a separation in the channel dimension, where segments of a same channel segment index are processed consecutively.
Figure 13:
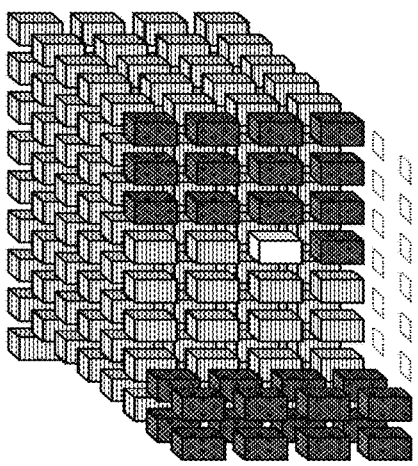
Figure 13:
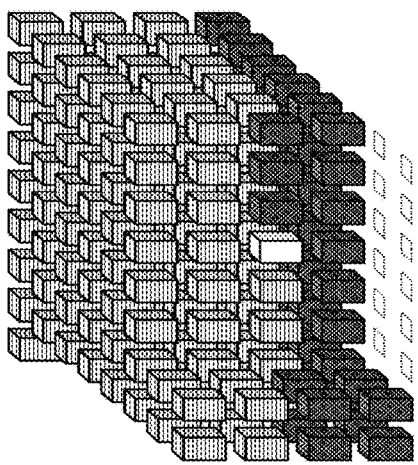

An arrangement 830 of the plurality of segments is processed by one or more layers of a neural network. Such an arrangement may be predefined, i.e. a specified order of scanning in the spatial and/or channel direction. An arrangement of a first exemplary embodiment may include a reshaping of the latent tensor into a sequential form 830. The reshaped tensor $\hat{y}_{seq}$ may have dimension $$\left(\frac{H}{D_e p_H} \cdot \frac{W}{D_e p_W}\right) \times (p_H \cdot p_W \cdot C_e),$$

where ($p_H$, $p_W$) corresponds to the size of a patch. This is exemplarily shown in FIG. 8, where both patch sizes $p_H$, $p_W$ are set to 1 and sixteen segments 820 of the exemplary 4×4×$C_e$-dimensional latent tensor 810 are arranged into a reshaped 16× $C_e$-dimensional tensor 830. FIG. 13a exemplarily depicts the processing order of the segments in the spatial dimension.

The neural network includes at least one attention layer. The attention mechanism is explained above in section Attention mechanism in Deep Learning with reference to FIGS. 5 and 6. The attention layer may be a multi-head attention layer as exemplarily described with respect to FIG. 6b. The attention layer may be included in a transformer subnetwork, which is exemplarily explained with reference to FIGS. 5a and 5b. The attention layer to be included in the transformer subnetwork may be any type of attention layer or multi-head attention layer.

A probability model for the entropy encoding of a current element of the latent tensor is obtained based on the processed plurality of segments. The current element may be entropy encoded into a first bitstream, for example the y bitstream 371 of FIG. 3, using the obtained probability model for the entropy encoding. A specific implementation for entropy encoding may be, for example, arithmetic encoding, which is discussed in the section Variational image compression. The present invention is not limited to such an exemplary arithmetic encoding. Any entropy encoding, which is able to base its encoding on an estimated entropy per element, may use the probabilities obtained by the present invention.

The separating of the latent tensor may include a separation 701 of the latent tensor into two or more segments in the channel dimension as it is shown for example in FIG. 7b. Such a separation into $N_{cs}$ channel segments may create a tensor $\hat{y}_{seq}$ with the shape of $$\left(N_{cs} \cdot \frac{H}{D_e \cdot p_H} \cdot \frac{W}{D_e \cdot p_W}\right) \times \left(\frac{p_H \cdot p_W \cdot C_e}{N_{cs}}\right).$$

Figure 9:
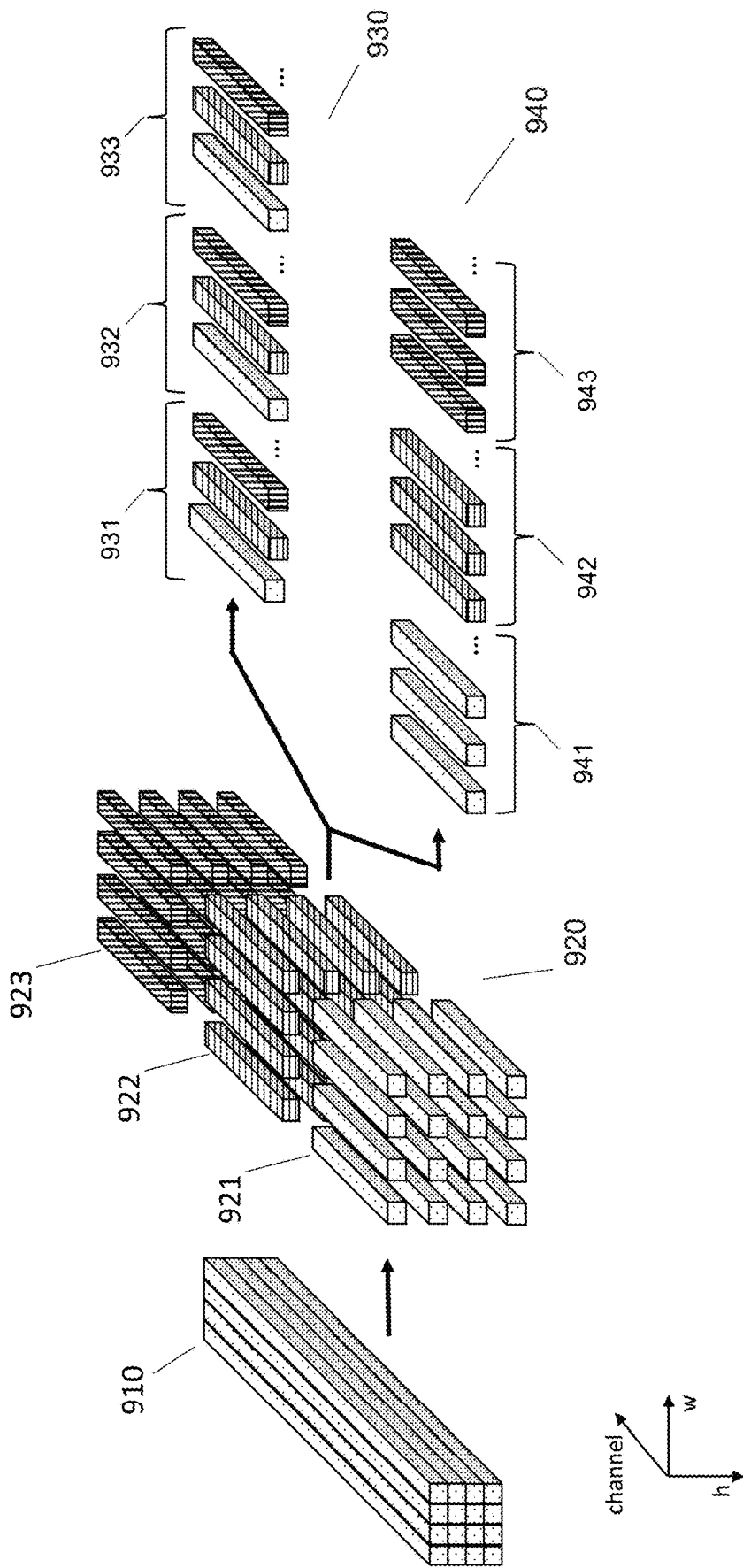
FIG. 9 shows an exemplary separation of a latent tensor into segments including a separation in the channel dimension and an exemplary arrangement of said segments.

A separation in the channel dimension 920 is exemplarily illustrated in FIG. 9, where both patch sizes $p_H$, $p_W$ are set to 1. Each spatial segment of the exemplary latent tensor 910 is split into three segments 920, 921 and 922 in the channel dimension. The exemplary 4×4×$C_e$-dimensional latent tensor 910 is separated into a tensor with the shape of $$48 \times \frac{C_e}{3}.$$

The maximal number of channel segments $N_{cs}$ is equal to the number of channels $C_e$ of the latent tensor $\hat{y}$. This spatio-channel attention mechanism fully considers the cross-channel correlations. Any other value of $N_{cs} < C_e$ may result in faster encoding and decoding, but may reduce the performance of the context model.

In a second exemplary embodiment, the segments may be arranged in a predefined order, wherein segments with a same spatial coordinate 931, 932 and 933 are grouped together. In other words, segments of a first spatial coordinate 930, which have different channel segment indices, for example, in the range [0, $N_{cs}$-1], may be grouped together. Consecutively, segments of a second spatial coordinate 931 having different channel indices may be grouped together.

The arrangement 930 may include a reshaping of the latent tensor segments into a tensor ŷseg with a shape of $$\left(\frac{H}{D_e \cdot p_H} \cdot \frac{W}{D_e \cdot p_W} \cdot N_{cs}\right) \times \left(\frac{p_H \cdot p_W \cdot C_e}{N_{cs}}\right).$$

Such an arrangement 930 of the segments is exemplarily shown in FIG. 9. Said reshaping may correspond to a coding order that processes segments of a first channel before processing segments of a second channel, i.e. correspond to a coding order that processes channel dimension first. FIG. 13b exemplarily depicts the processing order of the segments for such an arrangement. The segments of a same channel may be processed before processing segments of another channel having a different spatial coordinates.

In a third exemplary embodiment, segments, which have different spatial coordinates 941, 942 and 943, may be arranged 701 consecutively in a predefined order. In other words, the segments corresponding to a first channel segment index 940 may be grouped together. Consecutively, segments corresponding to a second channel segment index 491 may be grouped together. The arrangement 940 may include a reshaping of the latent tensor segments into a tensor $\hat{y}_{seq}$ with a shape of $$\left(N_{cs} \cdot \frac{H}{D_e \cdot p_H} \cdot \frac{W}{D_e \cdot p_W}\right) \times \left(\frac{p_H \cdot p_W \cdot C_e}{N_{cs}}\right).$$

Such an arrangement 940 is exemplarily shown in FIG. 9. Said reshaping may correspond to a coding order that processes spatial dimensions first. FIG. 13c exemplarily depicts the processing order of the segments for such an arrangement. The segments of a same channel segment index may be processed before processing segments having another channel segment index.

For simplicity, the first dimension, which describes the number of sequential elements of $\hat{y}_{seq}$, may be denoted by S. In the above example S equals $$\left(N_{cs} \cdot \frac{H}{D_e \cdot p_H} \cdot \frac{W}{D_e \cdot p_W}\right).$$

Figures 10A, 10B, 10C:
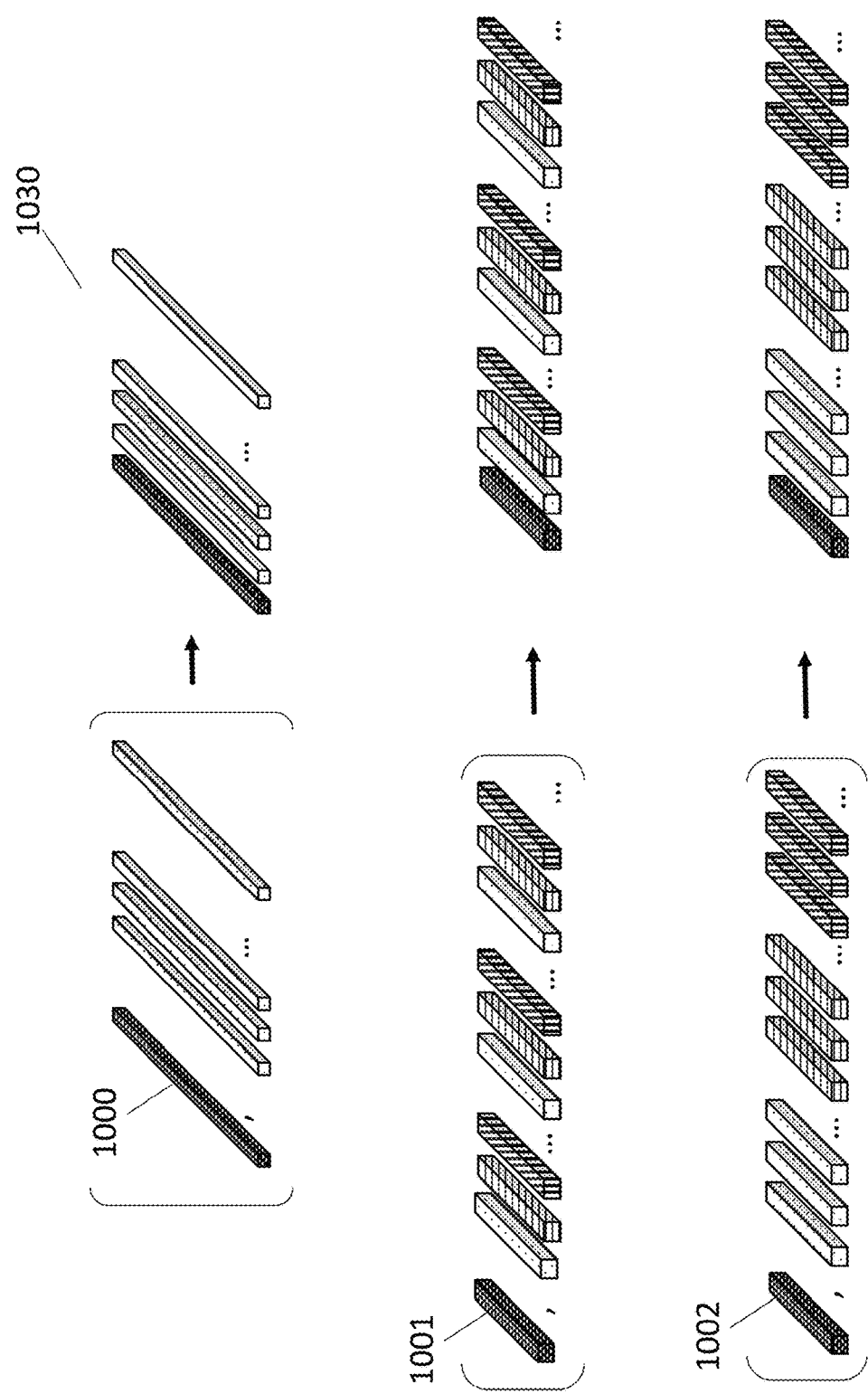
FIG. 10a illustrates the padding of an arrangement of segments.
FIG. 10b illustrates the padding of an arrangement in a first coding order of segments including a separation in the channel dimension.
FIG. 10c illustrates the padding of an arrangement in a second coding order of segments including a separation in the channel dimension.

The beginning of the arrangement of the plurality of segments of any of the above-mentioned exemplary embodiments may be padded 710, 711 with a zero segment 1000 before processing by the neural network. The zero segment may have the same dimensions as each segments within the plurality of segments. Each element within the zero segment may be zero. FIG. 10a illustrates such a padding 710 for the first exemplary embodiment, FIGS. 10b and c illustrate the padding 711 for the second and third exemplary embodiment corresponding to different arrangements of the latent tensor. FIG. 10a exemplarily shows the segments of the latent tensor of the first exemplary embodiment without performing a separation in the channel dimension. A zero segment 1000, which includes $C_e$ elements in the channel dimension, is padded at the beginning of the arrangement to obtain a padded arrangement 1030. FIG. 10b illustrates the padding of an arrangement of the second exemplary embodiment with a coding order that encodes segments of a same spatial coordinate first. The zero segment 1001 in this example includes $$\frac{C_e}{N_{cs}}$$

elements being zero. Similarly, in FIG. 10c, the padding for an arrangement of the third exemplary embodiment with a coding order that encodes segments of a same channel segment index first, is exemplarily depicted. The zero segment 1002 in this example includes $$\frac{C_e}{N_{cs}}$$

elements. The padding guarantees that the causality of the coding sequence is not disturbed, i.e. the decoder is able to decode data from the bitstream without additional prior knowledge.

The plurality of segments of the latent tensor may be processed by a first neural subnetwork 720. Such a first neural subnetwork may extract features from the plurality of segments. Said features may be independent deep features (also called embeddings). Therefore, said first neural subnetwork 720 is a so-called embedding layer to extract contextual embedding in high-dimensional real-valued vector space. The first neural subnetwork 720 may be a fully-connected neural network such as a multilayer perceptron, which is explained above. For example, a convolutional network (CNN) or a recurrent neural network (RNN) may be used. The output of the first neural subnetwork 720, the so-called context embedding, may be provided as an input to a subsequent layer of the neural network.

Positional information 721 of the plurality of segments may be provided as an input to the attention layer. Such positional information 721 may be combined with the output of the first neural subnetwork 720, for example, by concatenation, addition, or the like. The context embedding, which may be combined with the positional information 721, may be normalized 731. The positional encoding contains the positional information, for example, coordinates in a linear space. The positional encodings enable an attention layer to understand the sequential order of the input sequence. For example, these encodings can be learned or pre-defined tensors representing the order of the sequence can be used.

In the processing by the attention layer 732, a mask may be applied, which masks subsequent elements in an attention tensor following the current element within a processing order of the latent tensor. The mask prevents the subsequent elements to be used in the calculation of the attention tensor. In other words, the attention mechanism may be adapted to the autoregressive task in order to ensure causality at the decoder side. Such a masked attention mechanism is an attention mechanism that is masked so that it does not process any data that is not at a position preceding the current position in the attention layer input sequence. The masking is exemplarily shown in FIG. 13a-c, which indicate the processing order for the segments for a current segment. The segments yet to be coded are shown.

The attention mechanism by default is applied on the whole sequence S. That means each sequential element s; in S applies attention to itself and every other element. This behavior is not desirable for an autoregressive task since the network cannot use any element, which is not processed yet. In order to cope with this problem, attention mechanism may be limited by masking the scaled dot product in the attention mechanism. The mask may be described with a S×S matrix, where its lower triangle (including the diagonal) contains 1 and the upper triangle part (excluding the diagonal) consists of minus infinity (softmax($-\infty$)=0). The masked attention may be formulated as:

$$MaskedAttention(Q, K, V) = \text{softmax}\left(\frac{(QK^T) \odot M}{d_k}\right)V,$$

$$M = \begin{bmatrix} 1 & \cdots & -\infty \\ \vdots & \ddots & \vdots \\ 1 & \cdots & 1 \end{bmatrix}$$

where $\odot$ is the elementwise multiplication and is the mask.

However, the definition of the mask M is not limited to the above mentioned triangular matrix. In general, the undesired or yet-to-be-processed parts of the sequence may be masked, for example by multiplying with $-\infty$ while the rest may be multiplied with 1. The masking may be also applied for multi-head-attention, where each attention head is masked separately.

The masking of the present invention is not restricted to the application of this exemplary matrix M. Any other masking technique may be applied.

The output of the attention layer 732 may be processed by a second neural subnetwork 735. The second neural subnetwork 735 may be a multilayer perceptron. The output of the attention layer 732 may be normalized 734 before processing with the second neural subnetwork 735. The output of the attention layer 732 may be combined with the context embedding or with the combined representation of context embedding and positional information 721 by a residual connection 737.

The output of the attention based context model is denoted by $\phi$.

The probability model 770 for the entropy encoding may be selected according to computational complexity and/or properties of the first bitstream. Properties of the first bitstream 731 may include a predefined target rate or a frame size. A set of rules, which option to use may be predefined. In this case, the rules may be known by the decoder, thus additional signaling is not required.

The selection may include selecting whether the separating of the latent tensor is performed in the channel dimension. The selection may include selecting between different ways how the arrangement is performed, for example, spatial dimensions first or channel dimension first.

For example, in the case when the separation in the channel dimension is not performed, the performance of the context model may be limited since cross-channel correlations are not considered for entropy modeling. However, this case may provide faster encoding and decoding due a reduced number of required autoregressive steps.

For example, in a case with $N_{cs}>1$, cross-channel correlations are considered, which may increase the performance of the context model. In the extreme case, where the number of channel segments $N_{cs}$ is equal to the number of channels $C_e$ of the latent tensor $\hat{y}$, the model fully considers the cross-channel correlations. Any other number of channel segments $1 < N_{cs} < C_e$ provides a simplification of the extreme case for balancing the trade-off between the performance of the model and complexity.

In the first step of obtaining an optional hyper-prior model, a hyper-encoder 320 as shown in FIG. 3a is applied to the latent tensor to obtain a hyper-latent tensor. The hyper-latent tensor may be encoded into a second bitstream, for example the z bitstream 341. The second bitstream may be entropy decoded and a hyper-decoder output is obtained by hyper-decoding the hyper-latent tensor. The hyper-prior model may be obtained as explained in the section Variational image compression. However, the present disclosure is not limited to this exemplary implementation.

Similar to the latent tensor, the output of the optional hyper-decoder y may be separated into a plurality of hyper-decoder output segments 740. Each hyper-decoder output segment may include one or more hyper-decoder output elements. For each segment out of the plurality of segments, said segment and a set of hyper-decoder output segments out of the plurality of hyper-decoder output segments may be concatenated 750 before the probability model 770 is obtained. In other words, the tensors $\phi$ and $\psi$ may be concatenated in the channel dimension (last dimension) and may result in a concatenated two-dimensional tensor.

The hyper-decoder output segments may be arranged correspondingly to the arrangement of the plurality of the segments. The output of the hyper-decoder $\psi$ may be brought into sequential format same as the sequential format of the latent tensor $\hat{y}_{seq}$.

Figure 11:
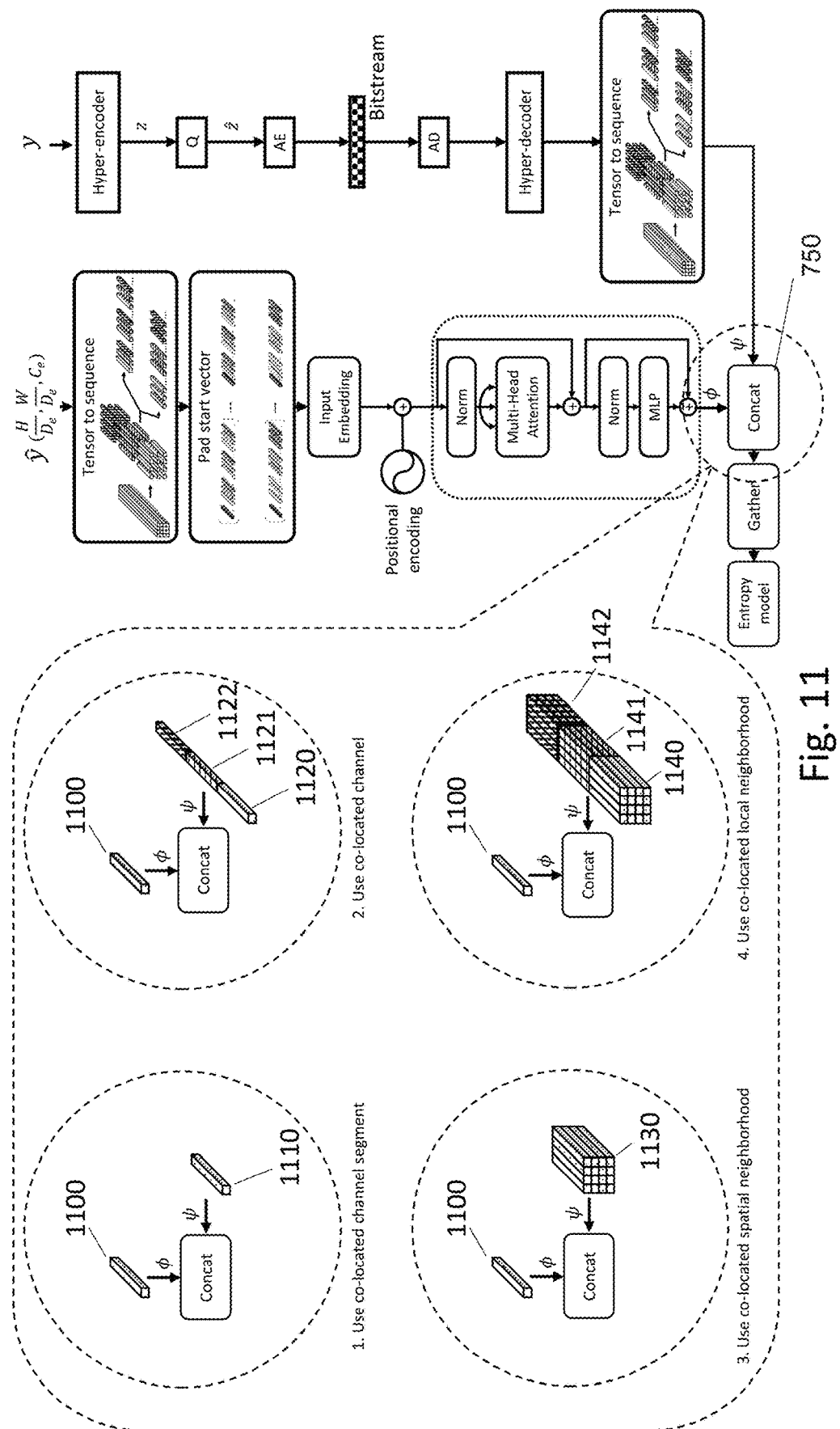
FIG. 11 shows exemplary implementations of concatenating processed segments of the latent tensor and a set hyper-prior output segments.

Examples for the set of hyper-encoder output segments are illustrated in FIG. 11. The arrangement of the segments of the latent tensor may be performed according to the second exemplary embodiment or third exemplary embodiment. In a fourth exemplary embodiment, the set of hyper-decoder output segments to be concatenated with a respective segment 1100 may include a hyper-decoder output segment 1110 corresponding to said respective segment. Said hyper-decoder output segment 1110 may have the same spatial coordinates and the same channel segment index as the respective segment 1100, i.e. the hyper-decoder output segment 1110 may be co-located to the respective segment 1100. Using the co-located hyper-decoder output segment 1110 in the concatenation may reduce the computational complexity and thus resulting a faster processing.

In a fifth exemplary embodiment, the set of hyper-decoder output segments to be concatenated with a respective segment 1100 may include a plurality of hyper-decoder output segments corresponding to a same channel as said respective segment. In other words, said plurality of hyper-decoder output segments may include hyper-decoder output segments, which have the same spatial coordinates as the respective segment, i.e. belong to a co-located channel. In the example in FIG. 11 there are three co-located hyper-decoder output segments 1120, 1121 and 1122, where a first hyper-decoder output segment 1120 has the same channel segment index and spatial coordinates as the exemplary respective segment 1100 of the latent tensor y. The two remaining hyper-decoder output segments 1121 and 1122 may have the same spatial coordinates as the exemplary respective segment 1100. The plurality of hyper-decoder output segments 1120, 1121 and 1122 may belong to a co-located channel of the respective segment 1100. This set of hyper-decoder output segments may increase the performance of the probability estimation as additional cross-channel correlations of the hyper-decoder output are taken into account.

In a sixth exemplary embodiment, the set of hyper-decoder output segments to be concatenated with a respective segment 1100 may include a plurality of hyper-decoder output segments 1130 spatially neighboring said respective segment 1100. Said plurality of hyper-decoder output segments 1130 spatially neighboring the respective segment 1100, which are exemplarily illustrated in FIG. 11, may have a same channel segment index as the respective segment 1100. The plurality of hyper-decoder output segments 1130 may belong to a co-located spatial neighborhood of the respective segment 1100. This set of hyper-decoder output segments may increase the performance of the probability estimation as additional spatial correlations of the hyper-decoder output are taken into account.

In a seventh exemplary embodiment, the set of hyper-decoder output segments to be concatenated with a respective segment may include a plurality of hyper-decoder output segments including neighboring segments 1140 spatially neighboring said respective segment and segments corresponding to a same channel 1141 and 1142 as said neighboring segments 1140. In other words, the set of hyper-decoder output segments may include hyper-decoder output segments 1140 spatially neighboring the respective segment 1100, which are exemplarily illustrated in FIG. 11 and may have a same channel segment index as the respective segment 1100. In addition, the set of hyper-decoder output segments may include hyper-decoder output segments 1141 and 1142, which may have the same spatial coordinates as the spatially neighboring hyper-decoder output segments 1140 and a channel segment index being different from the channel segment index of the spatially neighboring hyper-decoder output segments 1140. The hyper-decoder output segments to be concatenated may belong to a co-located local neighborhood of the respective segment 1100. This set of hyper-decoder output segments may increase the performance of the probability estimation as additional spatial and cross-channel correlations of the hyper-decoder output are taken into account.

The set of hyper-decoder output segments to be concatenated to a respective segment is not limited to the above-mentioned examples. Any other set of hyper-decoder output segments may be concatenated with a respective segment of the latent tensor. For example, any combination of the above-mentioned fourth to seventh exemplary embodiments may be used. Any the above-mentioned fourth to seventh exemplary embodiments and any combination thereof may be combined with any of the arrangements of the second or third exemplary embodiments.

Figure 12:
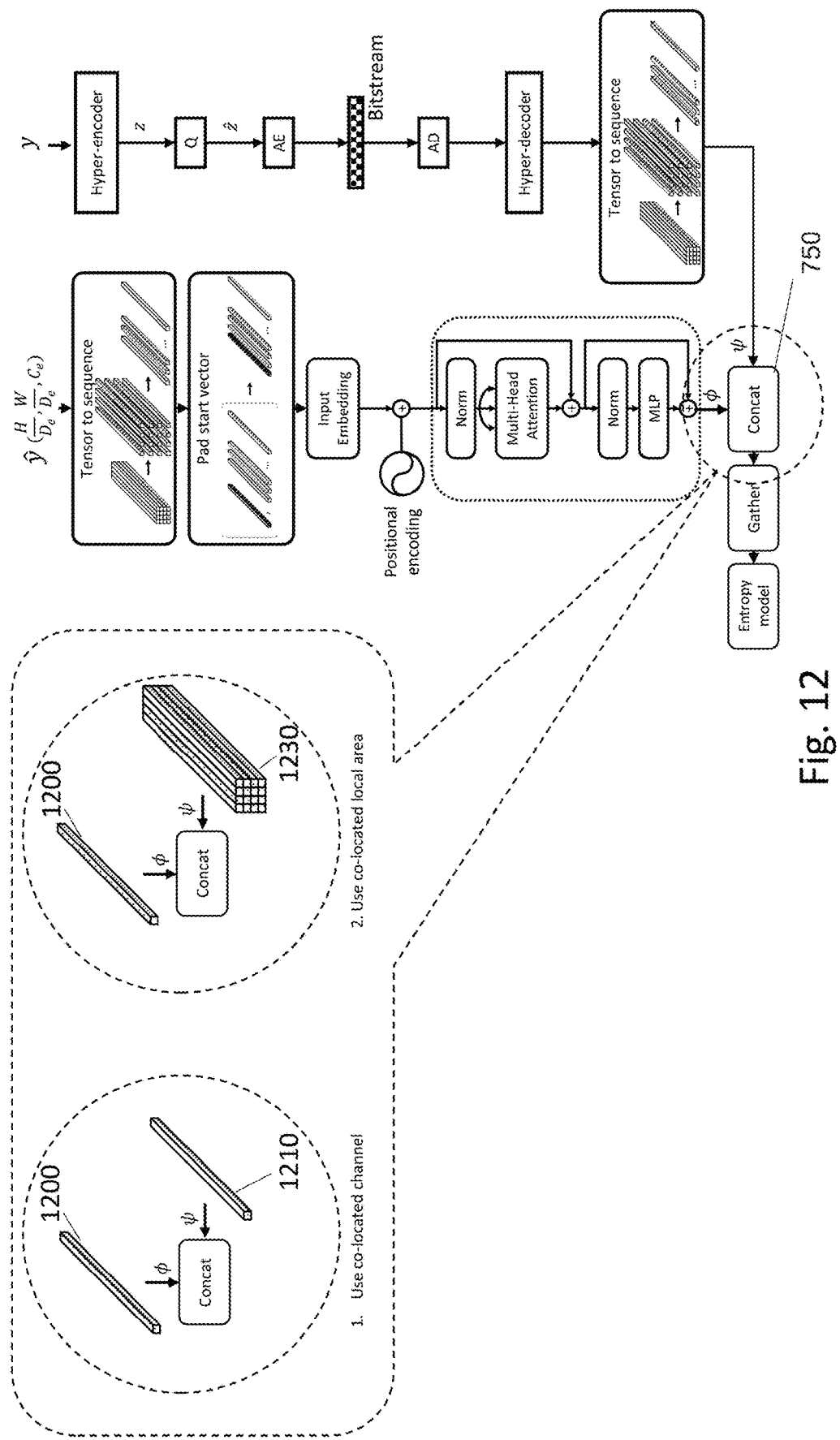
FIG. 12 shows further exemplary implementations of concatenating processed segments of the latent tensor and a set hyper-prior output segments.

FIG. 12 shows examples of the concatenating 750 in the case when the separating into segments in the channel dimension is not performed. The arrangement of the segments of the latent tensor may be performed according to the first exemplary embodiment. For example, the set of hyper-decoder output segments to be concatenated with a respective segment 1200 may include a hyper-decoder output segment 1210 corresponding to said respective segment. Said hyper-decoder output segment 1210 may have the same spatial coordinates and the same channel segment index as the respective segment 1200. For example, the set of hyper-decoder output segments to be concatenated with a respective segment 1200 may include a plurality of hyper-decoder output segments 1230 spatially neighboring said respective segment 1200. Said plurality of hyper-decoder output segments 1230 spatially neighboring the respective segment 1100 are exemplarily illustrated in FIG. 12.

The concatenated tensor has the size of $S \times (C_\phi + C_\psi)$, where $C_\phi$ and $C_\psi$ are the number of channels of the tensor $\phi$ and the number of channels from the tensor $\psi$, respectively. The result of the concatenation may be processed by a gathering process 760. For example, the gathering may be performed by a fully-connected neural network and a set of non-linear transformations on the last dimension. For example, the gathering may be implemented by one or several layers of convolutions with 1×1 kernel size and non-linear transformation(s). The entropy model 770 produces an estimation of the statistical properties of the quantized latent tensor $\hat{y}$. The entropy encoder 370 may use these statistical properties to create a bitstream representation 371 of the tensor $\hat{y}$.

Similar to the selection of the probability model for the entropy encoding, the set of hyper-decoder output segments may be selected adaptively according to computational complexity and/or properties of the first bitstream. Properties of the first bitstream may include a predefined target rate or a frame size. A set of rules, which option to use may be predefined. In this case, the rules may be known by the decoder, thus additional signaling is not required.

During the encoding, all elements of the latent tensor are available. Thus, the processing by the neural network and/or the entropy encoding the current element may be performed in parallel for each segment out of the plurality of segments.

The processing of the arrangement by the neural network may include selecting a subset of segments. Such a subset of segments is selected from the plurality of segments. The subset may be provided to a subsequent layer of the neural network. For example, the subset may be selected before applying the at least one attention layer. For example, the subset may be selected before applying the first neural subnetwork. Said subset of segments may include segments in a local neighborhood in the spatial dimensions. This is exemplarily shown in FIG. 14a-c. In the example in FIGS. 14a-c, the segments in the spatial vicinity of a current segment, which may be used by the context modelling, are illustrated. FIG. 14a shows the case, when the separating in the channel dimension may not be performed. FIG. 14b illustrates the exemplary case when segments of a first channel are being processed before segments of a second channel. FIG. 14c illustrates the exemplary case when segments of a first channel segment index are being processed before segments having a second channel segment index. The size of the attention mechanism in the context model is limited by the length of the sequence \seq. However, in case of limited available memory and/or positional encoding with a fixed size, the number of previously coded elements used for the context model may be limited. In this case, the context model can be applied on the latent tensor in a sliding window fashion where a sub-grid from the latent tensor y is extracted and processed by the context model in each iteration. Afterwards, the sub-grid is moved to its next position.

For decoding of the latent-space feature tensor from a first bitstream the latent tensor is initialized with zeroes, as the decoder is agnostic to the latent tensor and its statistical properties. The latent-space feature tensor, which includes one or more elements, is separated 700 into a plurality of segments 820 in the spatial dimensions as shown in FIGS. 7a and 8. Each segment includes at least one latent tensor element. Analogous to the encoding side, an arrangement of the plurality of segments is processed by one or more layers of a neural network. An arrangement corresponding to the first exemplary embodiment of the encoding side may include a reshaping of the latent tensor into a sequential form 830. The reshaped tensor $\hat{y}_{seq}$ may have dimension $$\left(\frac{H}{D_e p_H} \cdot \frac{W}{D_e p_W}\right) \times (p_H \cdot p_W \cdot C_e),$$

which has been explained above for the encoding and is shown exemplarily in FIG. 8.

The neural network includes at least one attention layer. The attention mechanism is explained above in section Attention mechanism in Deep Learning with reference to FIGS. 5 and 6. Corresponding to the encoding, the attention layer may be a multi-head attention layer as exemplarily described with respect to FIG. 6*b*. The attention layer may be included in a transformer subnetwork, which is exemplarily explained with reference to FIGS. 5*a* and 5*b*.

A probability model for the entropy decoding of a current element of the latent tensor is obtained based on the processed plurality of segments. The current element may be decoded from the first bitstream, for example the y bitstream 371 of FIG. 3, using the obtained probability model for the entropy decoding. A specific implementation for entropy decoding may be, for example, arithmetic decoding, which is discussed in the section Variational image compression. The present invention is not limited to such an exemplary arithmetic decoding. Any entropy decoding, which is able to base its decoding on an estimated entropy per element, may use the probabilities obtained by the present invention.

The separating of the latent tensor may include a separation 701 of the latent tensor into two or more segments in the channel dimension as it is shown for example in FIG. 9. Such a separation is explained in detail for the encoding side.

The segments may be arranged in a predefined order, wherein segments with a same spatial coordinate 931, 932 and 933 are grouped together. This arrangement 930 corresponds to the second exemplary embodiment, which is explained above in detail for the encoding.

Segments, which have different spatial coordinates 941, 942 and 943, may be arranged consecutively in a predefined order. Such an arrangement 940 is analogous to the third exemplary embodiment, which is explained above in detail for the encoding.

The beginning of the arrangement of the plurality of segments of any of the above-mentioned exemplary embodiments may be padded 710, 711 with a zero segment 1000 before processing by the neural network. The zero segment may have the same dimensions as each segments within the plurality of segments, which is illustrated exemplarily in FIGS. 10*a-c*. The padding is explained in detail above with reference to FIGS. 10*a-c*.

According to the encoding side, the plurality of segments of the latent tensor may be processed by a first neural subnetwork 720. Such a first neural subnetwork may extract features from the plurality of segments. Said features may be independent deep features. The first neural subnetwork 720 may be a multilayer perceptron. Positional information 721 of the plurality of segments may be provided as an input to the attention layer. Such positional information 721 may be combined with the output of the first neural subnetwork 720, for example, by concatenation, addition, or the like.

The output of the attention layer 732 may be processed by a second neural subnetwork 735 analogous to the encoding side. The second neural subnetwork 735 may be a multilayer perceptron. The output of the attention layer 732 may be combined with the context embedding or with the combined representation of context embedding and positional information 721 by a residual connection 737.

Similar to the encoding, the probability model 770 for the entropy encoding may be selected according to computational complexity and/or properties of the first bitstream. Properties of the first bitstream 731 may include a predefined target rate or a frame size. A set of rules, which option to use may be predefined. In this case, the rules may be known by the decoder.

A hyper-latent tensor may be entropy decoded from a second bitstream 341. The obtained hyper-latent tensor may be hyper-decoded into a hyper-decoder output v.

Similar to the latent tensor, the output of the optional hyper-decoder y may be separated into a plurality of hyper-decoder output segments 740. Each hyper-decoder output segment may include one or more hyper-decoder output elements. For each segment out of the plurality of segments, said segment and a set of hyper-decoder output segments out of the plurality of hyper-decoder output segments may be concatenated 750 before the probability model 770 is obtained.

Examples for the set of hyper-encoder output segments are illustrated in FIG. 11 and explained in detail for the encoding side in the fourth exemplary embodiment, the fifth exemplary embodiment, the sixth exemplary embodiment and the seventh exemplary embodiment. The set of hyper-encoder output segments may include one or more of a hyper-decoder output segment corresponding to said respective segment, or a plurality of hyper-decoder output segments corresponding to a same channel as said respective segment, or a plurality of hyper-decoder output segments spatially neighboring said respective segment, or a plurality of hyper-decoder output segments including neighboring segments spatially neighboring said respective segment and segments corresponding to a same channel as said neighboring segment. Any of the above-mentioned fourth to seventh exemplary embodiments and any combination thereof may be combined with any of the arrangements of the second or third exemplary embodiments.

Similar to the selection of the probability model for the entropy encoding, the set of hyper-decoder output segments may be selected adaptively according to computational complexity and/or properties of the first bitstream. Properties of the first bitstream include, for example, a predefined target rate or a frame size. A set of rules, which option to use may be predefined. In this case, the rules may be known by the decoder.

The processing of the arrangement by the neural network may include selecting a subset of segments. Such a subset of segments is selected from the plurality of segments. The subset may be provided to a subsequent layer of the neural network. Examples are explained above with reference to FIGS. 14*a-c*.

The probability model using an attention layer may be applied to the entropy decoding of a latent tensor that may be processed by an autodecoding convolutional neural network to obtain image data as discussed above.

Implementation within Picture Coding

The encoder 20 may be configured to receive a picture 17 (or picture data 17), e.g. picture of a sequence of pictures forming a video or video sequence. The received picture or picture data may also be a pre-processed picture 19 (or pre-processed picture data 19). For sake of simplicity the following description refers to the picture 17. The picture 17 may also be referred to as current picture or picture to be coded (in particular in video coding to distinguish the current picture from other pictures, e.g. previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RGB format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 color format.

Implementations in Hardware and Software

Some further implementations in hardware and software are described in the following.

Any of the encoding devices described with references to FIGS. 15-18 may provide means in order to carry out the entropy encoding of a latent tensor. A processing circuitry within any of these exemplary devices is configured to separate the latent tensor into a plurality of segments in the spatial dimensions, each segment including at least one latent tensor element, to process an arrangement of the plurality of segments by one or more layers of a neural network, including at least one attention layer, and to obtain a probability model for the entropy encoding of a current element of the latent tensor based on the processed plurality of segments.

The decoding devices in any of FIGS. 15-18, may contain a processing circuitry, which is adapted to perform the decoding method. The method as described above comprises initializing the latent tensor with zeroes, separating the latent tensor into a plurality of segments in the spatial dimensions, each segment including at least one latent tensor element, processing an arrangement of the plurality of segments by one or more layers of a neural network, including at least one attention layer; and obtaining a probability model for the entropy decoding of a current element of the latent tensor based on the processed plurality of segments.

Summarizing, methods and apparatuses are described for entropy encoding and decoding of a latent tensor, which includes separating the latent tensor into segments in the spatial dimensions, each segment including at least one latent tensor element. An arrangement of the segments is processed by a neural network; the neural network includes at least one attention layer. Based on the processed segment a probability model is obtained for entropy encoding or decoding of a latent tensor element.

In the following embodiments of a video coding system 10, a video encoder 20 and a video decoder 30 are described based on FIGS. 15 and 16.

Figure 15:
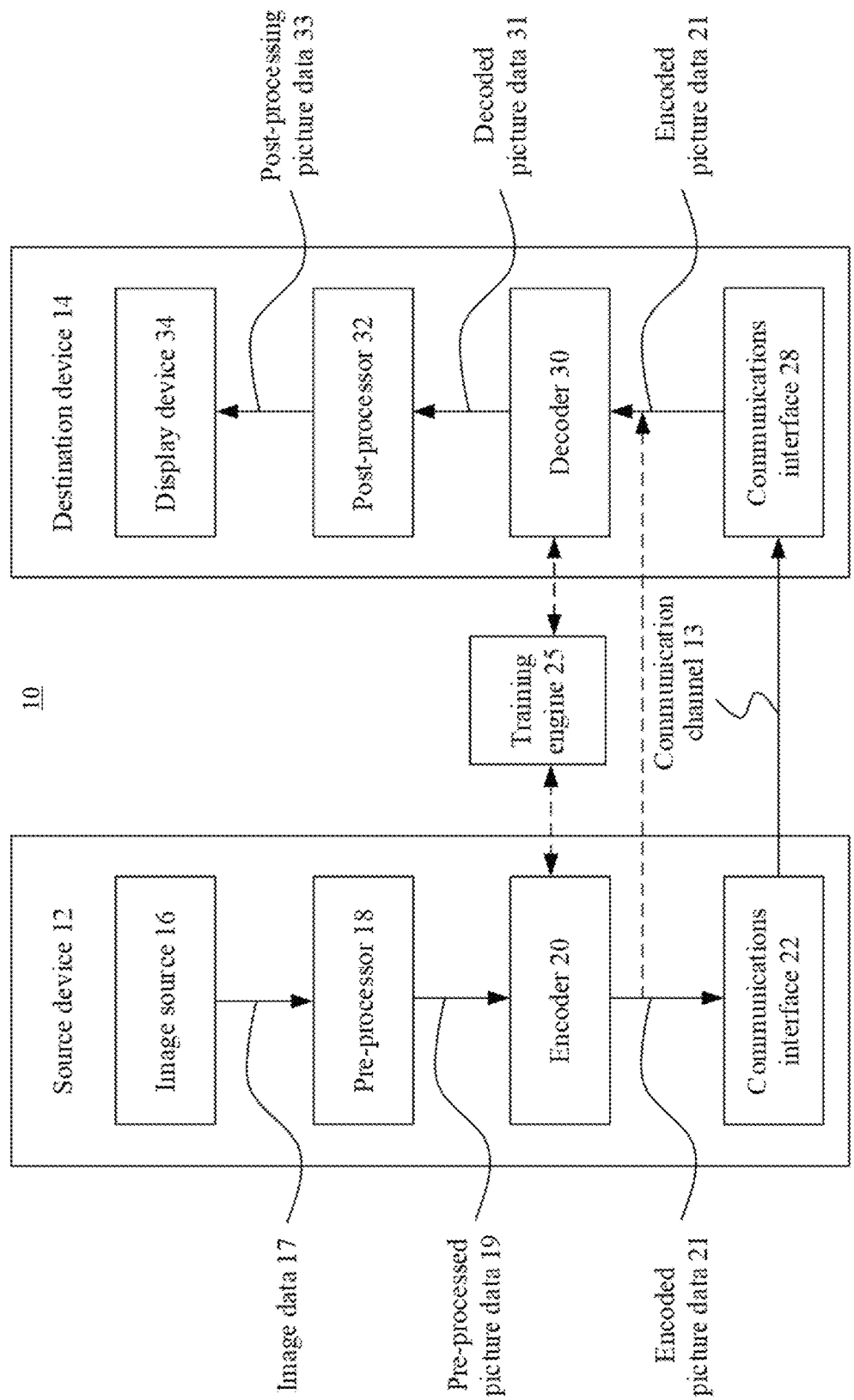
FIG. 15 is a block diagram showing an example of a video coding system configured to implement embodiments of the invention.

FIG. 15 is a schematic block diagram illustrating an example coding system 10, e.g. a video coding system 10 (or short coding system 10) that may utilize techniques of this present application. Video encoder 20 (or short encoder 20) and video decoder 30 (or short decoder 30) of video coding system 10 represent examples of devices that may be configured to perform techniques in accordance with various examples described in the present application.

Figure 16:
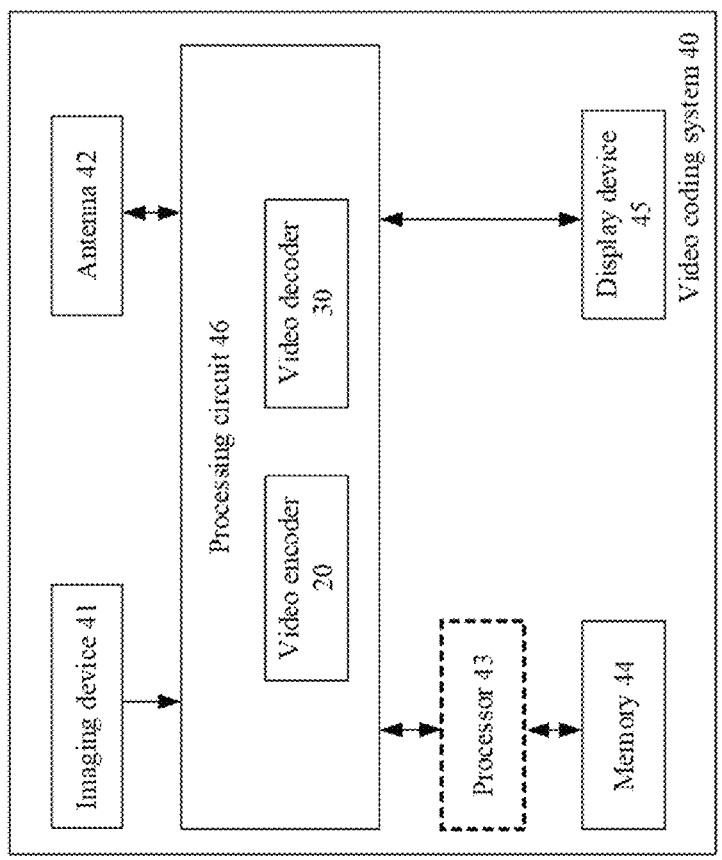
FIG. 16 is a block diagram showing another example of a video coding system configured to implement embodiments of the invention.

As shown in FIG. 16, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component.

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 15 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission.

The decoder 30 is configured to receive the encoded picture data 21 and provide decoded picture data 31 or a decoded picture 31.

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

The coding system 10 further includes a training engine 25. The training engine 25 is configured to train the encoder 20 (or modules within the encoder 20) or the decoder 30 (or modules within the decoder 30) to process an input picture or generate a probability model for entropy encoding as discussed above.

Although FIG. 15 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 15 may vary depending on the actual device and application.

Figure 18:
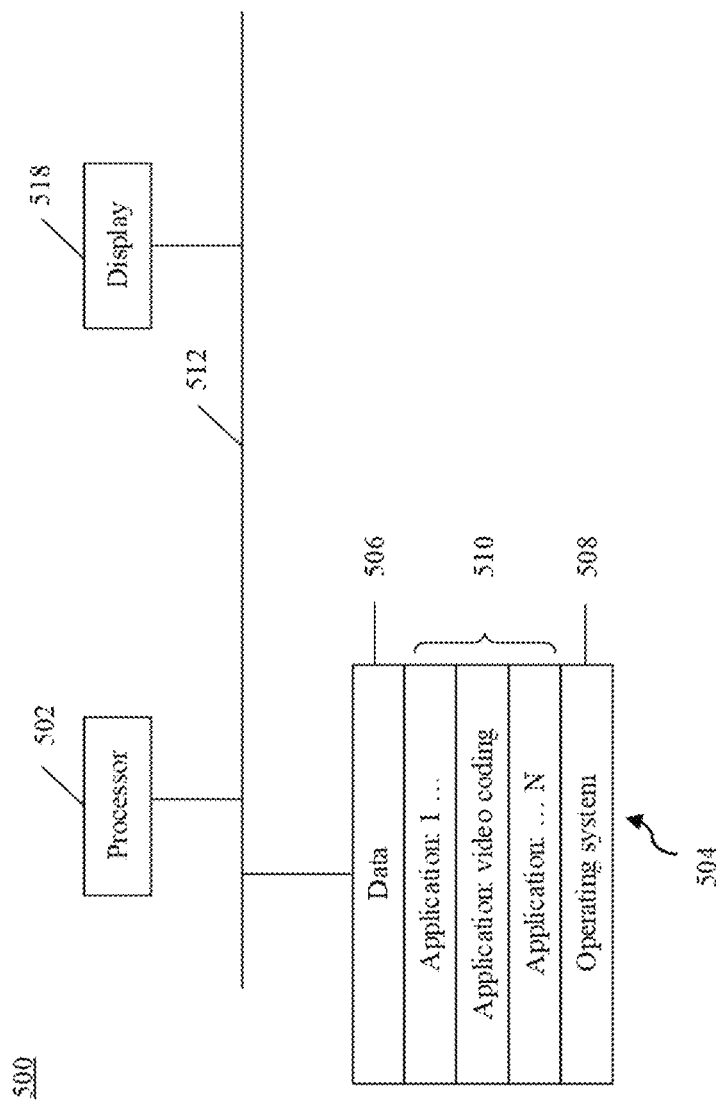
FIG. 18 is a block diagram illustrating another example of an encoding apparatus or a decoding apparatus.

The encoder 20 (e.g. a video encoder 20) or the decoder 30 (e.g. a video decoder 30) or both encoder 20 and decoder 30 may be implemented via processing circuitry as shown in FIG. 16, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder of FIG. 3b and/or any other encoder system or subsystem described herein. The decoder 30 may be implemented via processing circuitry 46 to embody the various modules as discussed with respect to decoder of FIG. 3c and/or any other decoder system or subsystem described herein. The processing circuitry may be configured to perform the various operations as discussed later. As shown in FIG. 18, if the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 16.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 15 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the invention are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the invention are not limited to HEVC or VVC.

Figure 17:
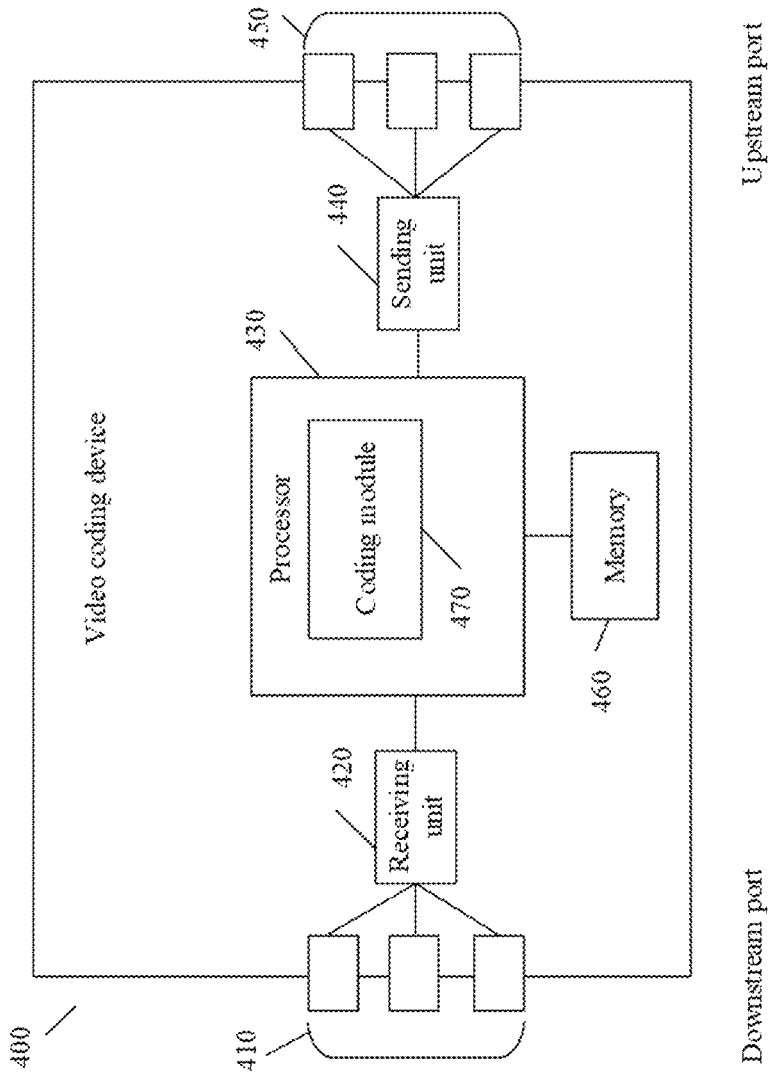
FIG. 17 is a block diagram illustrating an example of an encoding apparatus or a decoding apparatus.

FIG. 17 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 15 or an encoder such as video encoder 20 of FIG. 15.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

FIG. 18 is a simplified block diagram of an apparatus 500 that may be used as either or both of the source device 12 and the destination device 14 from FIG. 15 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described herein, including the encoding and decoding using a neural network with a subset of partially updatable layers.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Although embodiments of the invention have been primarily described based on video coding, it should be noted that embodiments of the coding system 10, encoder 20 and decoder 30 (and correspondingly the system 10) and the other embodiments described herein may also be configured for still picture processing or coding, i.e. the processing or coding of an individual picture independent of any preceding or consecutive picture as in video coding. In general only inter-prediction units 244 (encoder) and 344 (decoder) may not be available in case the picture processing coding is limited to a single picture 17. All other functionalities (also referred to as tools or technologies) of the video encoder 20 and video decoder 30 may equally be used for still picture processing, e.g. residual calculation 204/304, transform 206, quantization 208, inverse quantization 210/310, (inverse) transform 212/312, partitioning 262/362, intra-prediction 254/354, and/or loop filtering 220, 320, and entropy coding 270 and entropy decoding 304.

Embodiments, e.g. of the encoder 20 and the decoder 30, and functions described herein, e.g. with reference to the encoder 20 and the decoder 30, may be implemented in hardware, software, firmware, or any combination thereof. If implemented in software, the functions may be stored on a computer-readable medium or transmitted over communication media as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory, or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limiting, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

What is claimed is:

1. A method for entropy encoding of a latent tensor, comprising:
    separating the latent tensor into a plurality of segments in spatial dimensions, each segment of the plurality of segments including at least one latent tensor element;
    processing an arrangement of the plurality of segments by one or more layers of a neural network, the neural network including at least one attention layer, and wherein the processing the arrangement of the plurality of segments by the one or more layers of the neural network comprises:
        applying a first neural subnetwork to extract features of the plurality of segments;
        providing an output of the first neural subnetwork as an input to a subsequent layer within the neural network, wherein the output includes a context embedding; and
        providing positional information of the plurality of segments as input to the at least one attention layer, wherein the positional information is combined with the context embedding and enables the at least one attention layer to determine a sequential order of an input sequence that corresponds to the input; and
    obtaining a probability model for the entropy encoding of a current element of the latent tensor based on the processed plurality of segments.

2. The method according to claim 1, wherein separating the latent tensor comprises separating the latent tensor into two or more segments in a channel dimension.

3. The method according to claim 2, wherein the processing of the arrangement comprises arranging the plurality of segments in a predefined order, wherein segments of the plurality of segments with a same spatial coordinate are grouped together, or wherein the processing of the arrangement comprises arranging the plurality of segments, wherein the segments of the plurality of segments, which have different spatial coordinates, are arranged consecutively in a predefined order.

4. The method according to claim 1, wherein the processing of the arrangement of the plurality of segments includes selecting a subset of segments from the plurality of segments; and the subset is provided as an input to the subsequent layer within the neural network.

5. The method according to claim 1, wherein processing of the arrangement of the plurality of segments by the one or more layers of the neural network further comprises:
    applying a mask that masks elements in an attention tensor following the current element within a processing order of the latent tensor.

6. A computer program stored on a non-transitory medium and including code instructions, which, when executed on one or more processors, cause the one or more processors to execute steps of the method according to claim 1.

7. A method for entropy decoding of a latent tensor, comprising:
    initializing the latent tensor with zeroes;
    separating the latent tensor into a plurality of segments in spatial dimensions, each segment of the plurality of segments including at least one latent tensor element;
    processing an arrangement of the plurality of segments by one or more layers of a neural network, the neural network including at least one attention layer, and wherein the processing the arrangement of the plurality of segments by the one or more layers of the neural network comprises:
        applying a first neural subnetwork to extract features of the plurality of segments:
        providing an output of the first neural subnetwork as an input to a subsequent layer within the neural network, wherein the output includes a context embedding; and
        providing positional information of the plurality of segments as input to the at least one attention layer, wherein the positional information is combined with the context embedding and enables the at least one attention layer to determine a sequential order of an input sequence that corresponds to the input; and
    obtaining a probability model for the entropy decoding of a current element of the latent tensor based on the processed plurality of segments.

8. The method according to claim 7, wherein the separating the latent tensor comprises separating the latent tensor into two or more segments in a channel dimension.

9. The method according to claim 8, wherein the processing of the arrangement comprises arranging the plurality of segments in a predefined order, wherein segments of the plurality of segments with a same spatial coordinate are grouped together, or wherein the processing of the arrangement comprises arranging the plurality of segments, wherein the segments, which have different spatial coordinates, are arranged consecutively in a predefined order.

10. The method according to claim 7, wherein the processing of the arrangement of the plurality of segments includes selecting a subset of segments from the plurality of segments; and the subset is provided as an input to the subsequent layer within the neural network.

11. The method according to claim 7, wherein the neural network includes a second neural subnetwork, the second neural subnetwork processing an output of the at least one attention layer.

12. The method according to claim 11, wherein at least one of the first neural subnetwork and the second neural subnetwork of the neural network is a multilayer perceptron.

13. The method according to claim 7, wherein the at least one attention layer in the neural network is a multi-head attention layer.

14. The method according to claim 7, wherein the at least one attention layer in the neural network is included in a transformer subnetwork, and wherein the method further comprises
padding a beginning of the arrangement of the plurality of segments with a zero segment before processing by the neural network.

15. The method according to claim 7, further comprising:
entropy decoding the current element of the latent tensor into a first bitstream using the obtained probability model.

16. The method according to claim 15, further comprising selecting the probability model for the entropy decoding according to:
computational complexity and/or
properties of the first bitstream.

17. The method according to claim 7 further comprising:
entropy decoding a hyper-latent tensor from a second bitstream;
obtaining a hyper-decoder output by hyper-decoding the hyper-latent tensor;
separating the hyper-decoder output into a plurality of hyper-decoder output segments, each hyper-decoder output segments including one or more hyper-decoder output elements; and
for each segment out of the plurality of segments, concatenating the segment and a set of hyper-decoder output segments out of the plurality of hyper-decoder output segments before obtaining the probability model.

18. The method according to claim 17 further comprising adaptively selecting the set of hyper-decoder output segments according to:
computational complexity and/or
properties of the first bitstream generated by entropy decoding the current element of the latent tensor using the obtained probability model.

19. A method for decoding image data comprising:
entropy decoding a latent tensor from a bitstream according to claim 8; and
obtaining the image data by processing the latent tensor with an autodecoding convolutional neural network.

20. An apparatus for entropy encoding of a latent tensor, comprising:
processing circuitry configured to:
separate the latent tensor into a plurality of segments in spatial dimensions, each segment of the plurality of segments including at least one latent tensor element;
process an arrangement of the plurality of segments by one or more layers of a neural network, the neural network including at least one attention layer, and wherein the processing the arrangement of the plurality of segments by the one or more layers of the neural network comprises:
applying a first neural subnetwork to extract features of the plurality of segments;
providing an output of the first neural subnetwork as an input to a subsequent layer within the neural network, wherein the output includes a context embedding; and
providing positional information of the plurality of segments as input to the at least one attention layer, wherein the positional information is combined with the context embedding and enables the at least one attention layer to determine a sequential order of an input sequence that corresponds to the input; and
obtain a probability model for the entropy encoding of a current element of the latent tensor based on the processed plurality of segments.

21. An apparatus for entropy decoding of a latent tensor, comprising:
processing circuitry configured to:
initialize the latent tensor with zeroes;
separate the latent tensor into a plurality of segments in spatial dimensions, each segment of the plurality of segments including at least one latent tensor element;
process an arrangement of the plurality of segments by one or more layers of a neural network, the neural network including at least one attention layer, and wherein the processing the arrangement of the plurality of segments by the one or more layers of the neural network comprises:
applying a first neural subnetwork to extract features of the plurality of segments;
providing an output of the first neural subnetwork as an input to a subsequent layer within the neural network, wherein the output includes a context embedding; and
providing positional information of the plurality of segments as input to the at least one attention layer, wherein the positional information is combined with the context embedding and enables the at least one attention layer to determine a sequential order of an input sequence that corresponds to the input; and
obtain a probability model for the entropy decoding of a current element of the latent tensor based on the processed plurality of segments.

* * * * *